(12) United States Patent
Anthony et al.

(10) Patent No.: US 8,496,324 B2
(45) Date of Patent: Jul. 30, 2013

(54) INK COMPOSITION, DIGITAL PRINTING SYSTEM AND METHODS

(75) Inventors: Thomas Anthony, Sunnyvale, CA (US); Napoleon J. Leoni, San Jose, CA (US); Henryk Birecki, Palo Alto, CA (US); Omer Gila, Cupertino, CA (US); Michael H. Lee, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 263 days.

(21) Appl. No.: 12/848,092

(22) Filed: Jul. 30, 2010

(65) Prior Publication Data
US 2012/0026224 A1    Feb. 2, 2012

(51) Int. Cl.
*G01D 11/00*  (2006.01)
*B41J 29/38*  (2006.01)
*B41J 2/01*   (2006.01)

(52) U.S. Cl.
USPC ................................ 347/100; 347/9; 347/103

(58) Field of Classification Search
None
See application file for complete search history.

(56) References Cited

U.S. PATENT DOCUMENTS

| | | | |
|---|---|---|---|
| 4,758,276 A | 7/1988 | Lin et al. | |
| 5,592,204 A | 1/1997 | Lin et al. | |
| 6,053,438 A | 4/2000 | Romano, Jr. et al. | |
| 6,221,138 B1 | 4/2001 | Kenny | |
| 6,770,689 B1 | 8/2004 | Yoshimura et al. | |
| 7,008,744 B2 | 3/2006 | Horie et al. | |
| 7,173,077 B2 | 2/2007 | Yoshimura et al. | |
| 7,270,400 B2 | 9/2007 | Koguchi et al. | |
| 8,356,893 B2 * | 1/2013 | Chun et al. | 347/100 |
| 2002/0086916 A1 | 7/2002 | Morrison et al. | |
| 2005/0046675 A1 | 3/2005 | Aoshima | |
| 2005/0173307 A1 * | 8/2005 | Sakasai | 209/128 |
| 2005/0237373 A1 | 10/2005 | Koguchi et al. | |
| 2007/0089626 A1 | 4/2007 | Rasul et al. | |

FOREIGN PATENT DOCUMENTS
WO    WO 2009/134273 A1    11/2009

OTHER PUBLICATIONS
The Lubrizol Corporation, Product Guide Hyperdispersants, 2008.
The Lubrizol Corporation, Technology and Benefits-Hyperdispersants, 2008.

* cited by examiner

*Primary Examiner* — Geoffrey Mruk

(57) ABSTRACT

An ink composition has controlled conductivity, and a digital printing system and a method of printing an ink employ an offset inkjet printing platform. The ink composition includes pigment particles dispersed in an oil-based dielectric carrier fluid with an oil-soluble dispersant. A concentration of dispersant is a fraction of a concentration of the pigment particles sufficient to render an electrical conductivity of the ink composition less than 100 pico Siemens per centimeter (pS/cm). The printing system includes an ink having an electrical conductivity less than or equal to about 300 pS/cm, an inkjet print head, a transfer medium, a developer, a remover and an image transferer. In the method of printing, the ink is non-electrostatically jetted to the transfer medium, and developed into a fixed image. A portion of a supernatant is removed from the fixed image, and the fixed image is transferred to a media substrate.

20 Claims, 4 Drawing Sheets

INK COMPOSITION, DIGITAL PRINTING SYSTEM AND METHODS

CROSS-REFERENCE TO RELATED APPLICATIONS

N/A

STATEMENT REGARDING FEDERALLY SPONSORED RESEARCH OR DEVELOPMENT

N/A

BACKGROUND

Printing techniques can be broadly categorized into two groups: analog and digital. Common analog techniques are offset lithography, flexographic, gravure and screen printing. Inkjet and electrophotographic printing are the most prevalent digital technologies. Digital printing has an advantage over its analog counterpart in that printed output can be digitally altered, meaning that every printed page can be different. To change the printed output of an analog printer, a new set of imaging plates or stencils must be produced. Digital printing methods are more cost effective at low run lengths (number of pages), whereas at large page counts analog printing is more economical. Print quality is another vector of comparison between printing methods. Analog prints often have superior image quality and typically operate at higher printing speeds than digital printing methods.

Since the mid-1980s electrophotographic (EP) printing, commonly known as laser printing, has been a popular choice among consumers who demand high quality, professional looking printed communications. State-of-the-art commercial EP printers now have image quality that rivals lithographic offset printers, although printing speed and cost still favor analog printers for many print jobs.

Liquid electrophotographic (LEP) printing is a variant of EP printing that has superior image quality and the advantage of being compatible with a broad substrate gamut (coated and uncoated paper, plastic sheet, cardboard, folded cartons, shrink wrap and labels, for example). LEP ink uses a dielectric carrier fluid and pigmented resin as colorant particles. Electrophoretic attraction of charged ink particles to a laser exposed photoconductor forms the image, which is transferred to a heated blanket prior to final transfer to the substrate. High quality output can be achieved at print speeds consistent with many commercial printing requirements. However, analog offset printing is still favored for higher volume printing jobs.

Inkjet printers are now common and affordable and allow one to obtain photographic quality albeit at low printing speed. They are used in home printing, office printing and more recently, in commercial printing. Key advantages for inkjet technology in the commercial printing market are that printing width can be easily scaled and high print speeds are possible. Challenges facing traditional inkjet technology include a limited substrate gamut and high energy cost for removal of carrier fluid from water-based inks. Carrier fluid removal can limit print speed and areal coverage.

Inkjet inks typically include pigment particles dispersed in a carrier medium. It is a goal to have the particles remain dispersed in the carrier medium for extended periods of time. Significant sedimentation can result in poor inkjet print head performance by clogging print head nozzles or fluid channels. Also, it is a goal to have ink particles smaller than a maximum size to ensure proper inkjet print head performance. Particles above a maximum size may clog print head nozzles or fluid channels, or may adversely affect drop trajectory, leading to poor image quality.

One method for reducing sedimentation in ink compositions involves the addition of dispersants to the ink composition. Three major categories of dispersants are ionic (anionic and cationic), non-ionic and amphoteric. Stabilization of ink dispersions may be achieved with ionic dispersants, but the dispersants may give rise to highly charged compositions that are not suitable for at least some types of printing that require minimal or no charge.

BRIEF DESCRIPTION OF THE DRAWINGS

The various features of embodiments herein may be more readily understood with reference to the following detailed description taken in conjunction with the accompanying drawings, where like reference numerals designate like structural elements, and in which.

Figure 1:
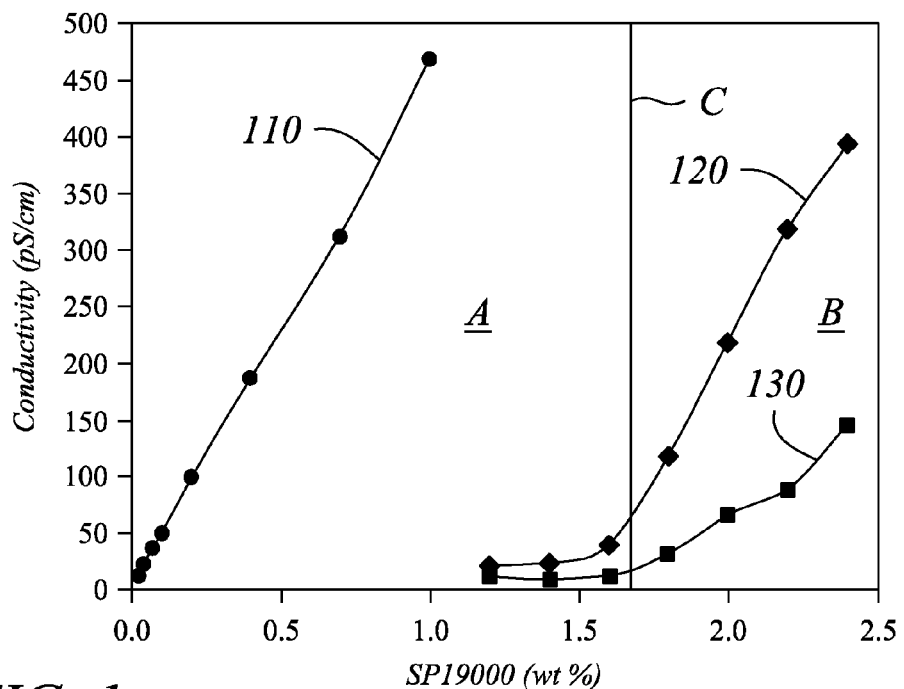
FIG. 1 illustrates a graph of effects that dispersant and pigment have on electrical conductivity of a dielectric carrier fluid, according to an embodiment.

Certain embodiments have other features that are one of in addition to and in lieu of the features illustrated in the above-referenced figures. These and other features are detailed below with reference to the preceding drawings.

DETAILED DESCRIPTION

Embodiments herein are directed to an ink composition having controlled conductivity, a digital printing system comprising an ink composition having controlled conductivity and methods of making and using the ink composition. The ink composition includes pigment particles dispersed in an oil-based dielectric carrier fluid with an oil-soluble dispersant. The electrical conductivity of the ink composition is less than or equal to about 300 pico Siemens per centimeter (pS/cm) in operable form, for example. In other examples, the electrical conductivity of one or both of the ink composition and a supernatant portion of the ink composition is less than 100 pS/cm in operable form. By 'operable form' it is meant that the ink composition is to be compatible with inkjet printing. In particular, the pigment concentration in the ink composition is consistent with the requirements of the inkjet printing application. Additionally, a particle size of the pigment particles of the ink composition is compatible with inkjet printing. Compatibility with inkjet printing is defined to mean that the ink composition is to be jetted from an inkjet print head or in other words, is in a jettable state. The particle size is compatible because it is below a threshold size such that the particles pass through the nozzle without introducing drop trajectory anomalies and substantially do not clog the nozzle orifice or ink delivery channels within the print head, at least as a result of particle size alone. By 'particle size' it is meant an average size of the pigment particles as measured by a standard particle sizing method such as dynamic light scattering (DLS). For many inkjet printing applications, particle size may be less than about 300 nanometers (nm). Hereinafter, the term 'operable ink composition' means the ink composition in operable form for inkjet printing, as defined herein, unless otherwise stated.

A ratio by weight fraction of the dispersant to the pigment particles in the dielectric carrier fluid of the operable ink composition is sufficient to produce a stable dispersion with the particle size less than about 300 nm and to render the electrical conductivity of the operable ink composition less than or equal to about 300 pS/cm. The electrical conductivity of a supernatant portion of the operable ink composition is less than or equal to the electrical conductivity of the operable ink composition. In some examples, the ratio of the dispersant to the pigment particles is sufficient to render the electrical conductivity of one or both of the operable ink composition and the supernatant portion thereof less than 100 pS/cm. In some examples, a concentration of the pigment particles in the ink composition ranges from about 1 weight percent to about 10 weight percent. Moreover, in some examples, a concentration of the dispersant is a fraction of the concentration of the pigment particles, wherein the fraction ranges from about 0.05 to about 1.0 by weight.

In some examples, the concentration of the dispersant is less than about 1.5 times a threshold concentration of the dispersant. By 'threshold concentration' it is meant a concentration of dispersant above which an electrical conductivity of one or both of the ink composition and the supernatant portion of the ink composition begins to rise in proportion to an amount of the dispersant that is added above the threshold concentration. By 'supernatant' it is meant the dielectric carrier fluid and free dispersant and therefore, no solids (i.e., no pigment particles). In some examples, the supernatant of the operable ink composition has an electrical conductivity that is less than 100 pS/cm, while the electrical conductivity of the ink composition in operable form may or may not be greater than 100 pS/cm. For example, as mentioned above, the electrical conductivity of the ink composition in operable form may be less than about 300 pS/cm. Moreover, the ratio of dispersant to pigment particles in the dielectric carrier fluid facilitates pigment particles cohesion to each other and adhesion to a surface (i.e., are 'fixed') in response to directed exposure by an energy source, for example.

Some embodiments are directed to a digital printing system that comprises an operable ink having controlled conductivity, wherein the ink has an electrical conductivity of less than or equal to about 300 pS/cm, for example. In some examples of the digital printing system, the electrical conductivity of one or both of the ink and the supernatant portion of the ink composition is less than 100 pS/cm. The digital printing system further includes a transfer medium, an inkjet print head, means for developing the ink on the transfer medium (i.e., a developer), means for removing a portion of the supernatant of the ink from the transfer medium (i.e., a remover), and means for transferring an image of fixed pigment particles to a substrate (i.e., an image transferer). In some examples, the transfer medium may be electrically grounded. The inkjet print head provides nonelectrostatic deposition of the ink to the transfer medium (i.e., deposition without assistance of an electric field). The means for developing facilitates one or both of pigment particle cohesion and pigment particle adhesion to the transfer medium, for example. Moreover, the image that is transferred to a substrate comprises the pigment particles that are fixed to the transfer medium after the portion of the supernatant is removed. In some examples, the inkjet print head is a piezoelectric inkjet print head. In some examples, the means for developing the ink may be an energy source to generate energy directed at the deposited ink composition on the transfer medium.

The digital printing system, also referred to as digital offset inkjet printing, is substantially a variant of digital printing, which combines attributes of inkjet technology and LEP technology in a print engine that has the potential for scalable substrate width, high print speed, broad substrate gamut, high image quality at high coverage and low cost per page. The digital offset inkjet print engine uses the inkjet print head to nonelectrostatically deposit the ink composition on the intermediate transfer medium (ITM) to form the image that is subsequently transferred to the substrate. In particular, some digital offset inkjet printing system embodiments include a piezoelectric inkjet print head that, by definition, does not use electrostatics to jet the ink composition. A critical step in the digital offset inkjet printing process is development or fixing of pigment in the jetted or deposited ink composition onto the surface of the ITM. Development and image retention on the ITM prior to transfer to the substrate is significantly improved by controlling the electrical conductivity characteristic of the ink composition.

Some embodiments are directed to a method of making the ink composition with controlled conductivity. The ink composition in operable form made by the method has an electrical conductivity, as provided above, for example a conductivity that is less than or equal to about 300 pS/cm, such that it is compatible with inkjet printing, and in particular, digital offset inkjet printing, as described above. In some examples, one or both of the operable ink composition made by the method and the supernatant portion of the operable ink composition has an electrical conductivity of less than 100 pS/cm. The method includes mixing together pigment particles and an oil-soluble (first) dispersant in an oil-based dielectric carrier fluid. An amount of the dispersant mixed is a fraction of an amount of the pigment particles. The fractional amount of dispersant is sufficient to render the controlled electrical conductivity in operable form. The method of making further includes processing the mixture in a manner that deagglomerates the pigment particles and forms an ink dispersion with an average particle size that is less than about 300 nm. The method further includes rendering the ink dispersion to an operable ink composition (i.e., for jetting). In some examples, the method further comprises adding dispersant (either additional first-mentioned dispersant or a second oil-soluble dispersant that is different from the first dispersant) to the processed mixture either until or as long as a concentration of the added dispersant is less than about 1.5 times a threshold concentration of dispersant. In some examples, the first-mentioned dispersant and the second dispersant are the same. In other embodiments, the first dispersant may substantially provide steric stabilization to the pigment particles and the second dispersant may substantially provide charge stabilization.

Some embodiments are directed to a method of printing an operable ink with controlled conductivity. In some examples, the ink has an electrical conductivity less than or equal to about 300 pS/cm in operable form for printing. As provided above, in other examples, the electrical conductivity of one or both of the operable ink and the supernatant portion thereof is less than 100 pS/cm. The method of printing includes nonelectrostatically jetting the ink from an inkjet print head onto an intermediate transfer medium. The method of printing further includes developing the ink on the intermediate transfer medium such that pigment particles from the ink are fixed to the intermediate transfer medium in an image. A ratio of dispersant to pigment particles in the dielectric carrier fluid of the ink is provided such that the pigment particles cohere to each other and adhere to a surface of the intermediate transfer medium in response to the development, for example. The method of printing further includes removing a portion of the supernatant (i.e., free dispersant and dielectric carrier fluid) from the fixed pigment particles, and transferring the image of fixed pigment particles to a substrate. In some examples, the intermediate transfer medium may be electrically grounded for the printing method. Developing the ink may include directly exposing the ink on the intermediate transfer medium to an electric field or an electric charge. The directed exposure facilitates cohesion of the pigment particles to each other and adhesion of the pigment particles to the intermediate transfer medium surface, for example.

As used herein, the article 'a' is intended to have its ordinary meaning in the patent arts, namely 'one or more'. For example, 'a dispersant' generally means one or more dispersants and as such, 'the dispersant' means 'the dispersant(s)' herein. The phrase 'at least' as used herein means that the number of specified items may be equal to or greater than the number recited. The terms 'surface' and 'surface layer' may be used interchangeably to have the same meaning, unless otherwise indicated. The term 'about' as used herein means that the number recited may differ by plus or minus 20%; for example, 'about 5' means a range of 4.0 to 6.0. The term 'between' when used in conjunction with two numbers such as, for example, 'between about 2 and about 50' includes both of the numbers recited. The term 'substantially' as used herein means a majority, or almost all or all, or an amount with a range of about 51% to 100%, for example. Also, any reference herein to 'top', 'bottom', 'upper', 'lower', 'up', 'down', 'left' or 'right' is not intended to be a limitation herein. Moreover, examples herein are intended to be illustrative only and are presented for discussion purposes and not by way of limitation.

The pigment particles of the ink composition are colorant particles of either an organic pigment or an inorganic pigment. The pigment may be a naturally-occurring pigment or a synthetic pigment. The pigment can be of any color including, but not limited to, black, blue, brown, cyan, green, white, violet, magenta, red, orange and yellow, as well as spot colors from mixtures thereof. For digital printing, important colors include Cyan (C), Magenta (M), Yellow (Y), and Black (K), which are precisely intermingled in dot form to create thousands of other colors. In some examples, the pigment particles of the ink composition may be coated with or encapsulated in an organic polymer. In some examples, an organic polymer may be added to the ink composition. The organic polymer may improve adhesion between the pigment and substrate in the printed image. The pigment may be a single particulate pigment or a mixture of two or more particulate pigments, for example. The pigment particles are dispersible in the dielectric carrier fluid using a dispersant. The term "dispersible" means that the pigment particles may achieve a relatively even distribution throughout the dielectric carrier fluid as distinct particles for a period of time. A 'stable' dispersion is a dispersion wherein the pigment particles do not substantially reagglomerate in solution after deagglomeration, for example.

The shape of the pigment particles may be regular or irregular. The pigment particles may be in the form of a bead, flake, plate, rod, platelet, cube, sphere and cylinder, for example. The cross-sectional shape of the pigment particles may be circular, elliptical, oval, triangular, quadrangular or hexangular, and have smooth or corrugated edges, for example.

The particle size of the pigment particles of the ink composition is less than 1 micron. In some examples, the particle size of the pigment particles is less than about 500 nanometers (nm). In particular, an average particle size of the pigment particles of the ink composition in operable form (e.g., for jetting) is equal to or less than about 300 nm. The average particle size may range anywhere from about 100 nm to about 300 nm, for example.

Examples of organic pigments that may be present in the ink composition include, but are not limited to, perylenes, phthalocyanine pigments (for example, phthalo green, phthalo blue), cyanine pigments (Cy3, Cy5, and Cy7), naphthalocyanine pigments, nitroso pigments, monoazo pigments, disazo pigments, disazo condensation pigments, basic dye pigments, alkali blue pigments, blue lake pigments, phloxin pigments, quinacridone pigments, lake pigments of acid yellow 1 and 3, isoindolinone pigments, dioxazine pigments, carbazole dioxazine violet pigments, alizarine lake pigments, vat pigments, phthaloxy amine pigments, carmine lake pigments, tetrachloroisoindolinone pigments, perinone pigments, thioindigo pigments, anthraquinone pigments and quinophthalone pigments, and mixtures of two or more of the above and derivatives of the above. Representative examples of organic pigments include, but are not limited to, HOSTAPERM® Yellow H5G10 (Pigment Yellow 213, quinoxalinedione-based monoazo pigment), Toner Yellow HG (Pigment Yellow 180, benzimidazolone disazo pigment), and Toner Magenta 6B VP2213 (Pigment Red 57:1, lithol rubine azo pigment laked with calcium), all from Clariant GmbH, Frankfurt, Germany.

Inorganic pigments that may be present in the ink composition, include, but are not limited to, metal oxides (for example, titanium dioxide, iron oxides (e.g., red iron oxide, yellow iron oxide, black iron oxide and transparent iron oxides), aluminum oxides, silicon oxides), carbon black pigments (e.g., furnace blacks), metal sulfides, metal chlorides, and mixtures of two or more thereof.

The amount of the pigment in the ink composition depends on a number of factors, for example, the nature of the pigment, the nature of the use of the ink composition, the nature of the jetting mechanism for the ink, and the nature of other ink components including, but not limited to, the dielectric carrier fluid, the dispersant and additives. In some examples, the concentration (in percent by weight) of pigment particles in the ink composition in operable form ranges from about 1% to about 10%. In some examples, the concentration of pigment particles in the ink composition ranges from about 2% to about 8%, or from about 3% to about 6% by weight. The amount of pigment present in the ink composition may range between any combination of these values, inclusive of the recited values. In some examples, the amount of pigment in the ink operable composition may range from about 1% to about 9%, or about 3% to about 7%, or about 3% to about 5%, or about 4% to about 5%, or about 4% to about 6%, or about 7% to about 10%, or about 8% to about 9%, by weight. For example, the concentration of pigment particles in the ink composition may be about 4% by weight, in some examples.

The dielectric carrier fluid of the ink composition is an oil-based solvent. By definition, the dielectric carrier fluid has a low dielectric constant (typically less than 3) and a low intrinsic conductivity (typically less than 10 pS/cm). The dielectric carrier fluid is nonpolar and substantially does not contribute charge to the ink composition. A suitable dielectric carrier fluid is selected such that the combination of the pigment and the dispersant in the dielectric carrier fluid results in an electrical conductivity of less than or equal to about 300 pS/cm in some examples, and less than 100 pS/cm for one or both of the ink composition in operable form and the supernatant portion of the operable ink composition, in other examples. The supernatant is the fluid matrix without pigment solids, as mentioned above.

In some examples, the dielectric carrier fluid is an oil-based hydrocarbon that is a liquid at ambient temperature (about 20° C. to 30° C.). The hydrocarbon may be branched, unbranched or cyclic. For example, the hydrocarbon may be an aliphatic oil. In some examples, the oil-based hydrocarbon may have a number of carbon atoms ranging from about 8 to about 25 carbon atoms. For example, the oil-based hydrocarbon may have about 10 to about 20 carbon atoms, or about 11 to about 15 carbon atoms, or about 9 to about 24 carbon atoms, or about 12 to about 22 carbon atoms. The number of carbon atoms of the oil-based hydrocarbon may range within or between any combinations of the above values, inclusive of the recited values. Moreover, there may be more or less carbon atoms in the oil-based hydrocarbon than provided by any of the above recited ranges and still be within the scope of the examples. In some examples, the oil-based hydrocarbon may have a boiling point at, or in a range found within, about 150° C. to about 400° C. For example, the boiling point may range from about 180° C. to about 350° C., or about 180° C. to about 300° C. The boiling point range of a boiling fraction containing a single hydrocarbon or a mixture of hydrocarbons may range within or between any combinations of the above values, inclusive of the recited values. Moreover, the boiling point range may be greater than any of the above recited values and still be within the scope of the examples.

In some examples, the hydrocarbon may be an alkane, an isoalkane, a tertiary alkane, a cyclic or multicyclic alkane or an aromatic compound, or a mixture of two or more of them where the mixture is a specific boiling point fraction including, but not limited to, a mixture of alkanes having a boiling point fraction within the boiling point range mentioned above. In some examples, the hydrocarbon may be an isoparaffinic hydrocarbon solvent, or a paraffinic hydrocarbon solvent. In another example, the hydrocarbon may be a mineral oil. Particular examples of isoparaffinic hydrocarbons include, but are not limited to, one or more ISOPAR® isoparaffinic hydrocarbon solvents from ExxonMobil Chemical Company, Houston Tex., such as solvents known as ISOPAR® G, ISOPAR® L, ISOPAR® M and ISOPAR® V. For example, ISOPAR® L has about 11 to about 13 carbons and a boiling point of about 200° C.; and ISOPAR® V has about 14 to about 18 carbons and a boiling point of about 300° C. ISOPAR® L and ISOPAR® V isoparaffinic solvents are representative of aliphatic oils that may be used, for example. In another example, the dielectric carrier fluid may be a combination of one or more of the hydrocarbon solvents and oils listed above.

The dispersant is soluble in the dielectric carrier fluid (i.e., 'oil-soluble'), and the dispersant may have an ability to create some charge in the nonpolar dielectric carrier fluid. For example, in nonpolar solutions, the dispersant may form inverse micelles that may be charged. Moreover, the dispersant will interact with the pigment particles, for example chemically interact with a surface of the pigment particles. In some examples, the dispersant has a polar head and a hydrocarbon tail. The dispersant provides one or both of charge stabilization and steric stabilization to the ink composition. In some embodiments, a first dispersant substantially provides steric stabilization and a second dispersant substantially provides charge stabilization. Herein, the term 'dispersant' includes within its scope both the 'first dispersant' and the 'second dispersant' unless otherwise stated.

In some examples, the dispersant is a polymeric compound comprising primarily carbon, hydrogen and one or both of nitrogen or oxygen. The polymer may be a linear polymer or a branched polymer or a combination thereof. A linear polymer comprises a linear chain of atoms and a branched polymer comprises a branched chain of atoms. One or more atoms of the linear chain may have one or more substituents in place of hydrogen, for example. In some examples, the polymer may be a copolymer comprising more than one type of monomer unit. The relationship of the different monomer units in the polymer may be alternating, random or periodic, for example. The polymer may also be in a block copolymer arrangement where blocks of repeating monomer units form the polymer chain. For example, the polymeric dispersant may comprise a polymeric saturated fatty acid backbone or a polymeric unsaturated fatty acid backbone and one or more functionalities including, but not limited to, amine, amide, carboxyl and hydroxyl, to interact with pigment surface chemistry.

In some examples, the dispersant comprises an organic polyamine which is a polymeric compound that comprises primarily carbon, hydrogen and nitrogen. Monomer units of the organic polyamine comprise carbon atoms and may additionally comprise one or more heteroatoms such as, for example, oxygen, sulfur, nitrogen or phosphorus. Organic polyamine polymers that may be employed are commercially available or may be synthesized using standard polymerization techniques, for example.

In some examples, the solubility of the organic polyamine in the dielectric carrier fluid is at least about 85% to about 100%, or about 87% to about 98%, or about 90% to about 96%, for example. The solubility of the organic polyamine in the dielectric carrier fluid may range between any combination of these values, inclusive of the recited values. In some examples, the organic polyamine comprises an unsaturated polymeric fatty acid backbone and at least one oligomeric amine-containing group. In other examples, the organic polyamine comprises a saturated polymeric fatty acid backbone and at least one oligomeric amine-containing group. The oligomeric amine-containing group or groups may be pendant from one or more positions along the polymeric fatty acid backbone including terminal positions.

In some examples, the organic polyamine may be a cationic polymer as a result of protonation of one or more of the amine groups of the organic polyamine, for example. The cationic polymer generally includes a counter ion, the nature of which depends on the nature of the cation, for example. Specific examples of counter ions for cationic polymers include, but are not limited to, halogen anion such as chloride, bromide, iodide; carboxylic acid anion; phosphoric acid anion; sulfuric acid anion; hexafluorophosphorus anion; tetraphenyl boronic anion; chlorate; perchlorate, nitrate, and phenolate. Cationic polymers that may be employed are commercially available or may be synthesized using standard polymerization techniques, for example. Examples of other characteristics of polyamine dispersants are provided in the Definitions section below.

Some examples of the dispersant that comprises an organic polyamine material include, but are not limited to, one or more of SOLSPERSE® SP 19000, SOLSPERSE® SP9000, SOLSPERSE® SP11200, SOLSPERSE® SP13300 and SOLSPERSE® SP13940, which are available from The Lubrizol Corporation (Wickliffe Ohio). These dispersants may comprise different combinations of a polyamine (e.g., cationic or nonionic) and a backbone of a fatty acid (e.g., a saturated fatty acid, an unsaturated fatty acid, a polymeric fatty acid or a nonpolymeric fatty acid), which may be proprietary to Lubrizol. In another example, an organic polyamine dispersant material, OLOA® 11000, from Chevron Phillips Chemical Company (The Woodlands Tex.) may be used. In other examples, the dispersant comprises an organic polyethylene amine material including, but not limited to one or more of LZ2155, OS13709, OS14179, OS13309 and OS45479, which are available from Lubrizol Corporation.

In some examples, the dispersant comprises an organic polyacid which is a polymeric compound that comprises primarily carbon, hydrogen and oxygen. Monomer units of the polymeric compound comprise carbon atoms and may additionally comprise one or more heteroatoms such as, for example, oxygen, sulfur, nitrogen and phosphorus, and combinations thereof. In some examples, the organic polyacid may be non-ionic. In some examples, the organic polyacid may have a number of carboxyl groups or may have one carboxyl group and a number of hydroxyl groups. The organic polyacids are commercially available or may be synthesized using standard polymerization techniques, for example.

In some examples, the solubility of the organic polyacid in the dielectric carrier fluid is at least about 85% to about 100%, or about 87% to about 98%, or about 90% to about 96%, or about 92% to about 94%. The solubility of the organic polyacid in the dielectric carrier fluid may range between any combination of these values, inclusive of the recited values, for example. In some examples, the organic polyacid may be a polymeric hydroxy fatty acid (poly(hydroxy fatty acid)). The fatty acid may be saturated or unsaturated (comprising at least one double or triple bond). Other characteristics of polyacid dispersants are provided in the Definition section below, for example.

Some examples of dispersants that comprise an organic polyacid material include, but are not limited to, one or more of SOLSPERSE® SP21000 and SOLSPERSE® SP3000, which are available from Lubrizol Corporation. These dispersants comprise different polymeric fatty acids that may or may not include a hydroxyl moiety, which may be proprietary to Lubrizol. Other organic polyacid dispersants that may be used include, but are not limited to, any of EFKA® 6525, EFKA® 7544, and EFKA® 7564 from Ciba Corporation (Suffolk Va.), for example.

The amount and type of dispersant used in the ink composition are dependent on one or more of the nature of the dispersant, the nature of the pigment particles, the concentration of the pigment particles and the nature of the dielectric carrier fluid, for example. The amount (by weight percent) of the dispersant is that which, in conjunction with the pigment particles and the dielectric carrier fluid, is sufficient to render the electrical conductivity of the ink composition to a conductivity defined herein and facilitate a dispersion of the pigment particles, where the pigment particles have an average particle size equal to or less than about 300 nm, for example. The concentration of the dispersant in the ink composition (in operable form) is a fraction of the concentration of the pigment particles in the ink composition. For example, the fraction ranges from about 0.05 and about 1.0 of the pigment particle concentration. In some examples, the fraction may range from about 0.07 to about 1.0, or about 0.1 to about 1.0, or about 0.2 to about 1.0, or about 0.2 to about 0.8, or about 0.2 to about 0.6, or about 0.5 to about 1.0, or about 0.5 to about 0.8 of the pigment particle concentration. The dispersant concentration fraction of the pigment particle concentration may range between any combination of these values, inclusive of the recited values, for example.

In some examples, the amount of the dispersant in the ink composition is determined empirically by preparing ink compositions containing varying amounts of the components and measuring the conductivity of the ink composition. The electrical conductivity may be measured by any standard instrument for measurement of conductivity or resistance such as, for example, a Scientifica model 627 conductivity meter from Scientifica Co. of Princeton, N.J. Microprocessor-based conductivity analyzers, non-microprocessor-based conductivity analyzers, analyzers employing contacting style sensors or non-contacting style sensors, and a Wheatstone Bridge, for example, may be employed.

The concentration or weight fraction of the dispersant relative to the concentration of pigment in the ink composition is sufficient to render the electrical conductivity of the operable ink composition less than or equal to about 300 pS/cm. In some examples, the relative dispersant concentration renders the electrical conductivity of the operable ink composition less than or equal to about 290 pS/cm, or less than or equal to about 270 pS/cm, or less than or equal to about 250 pS/cm, or less than or equal to about 225 pS/cm, or less than or equal to about 200 pS/cm, or less than or equal to about 180 pS/cm, or less than or equal to about 160 pS/cm, or less than or equal to about 145 pS/cm, or less than or equal to about 125 pS/cm, or equal to about 100 pS/cm. Moreover, the electrical conductivity of the supernatant portion of the ink composition is less than or equal to the electrical conductivity of the respective ink composition.

In some examples, the weight ratio of dispersant to pigment is sufficient to render the electrical conductivity of one or both of the operable ink composition and the supernatant portion thereof less than 100 pS/cm. For example, the electrical conductivity of one or both of the operable ink composition and the supernatant portion independently may range from about 10 pS/cm to about 99 pS/cm, or from about 15 pS/cm to about 95 pS/cm, or from about 20 pS/cm to about 90 pS/cm, or from about 25 pS/cm to about 85 pS/cm, or from about 30 pS/cm to about 80 pS/cm, or from about 35 pS/cm to about 75 pS/cm, or from about 40 pS/cm to about 70 pS/cm, or from about 45 pS/cm to about 65 pS/cm, or about 50 pS/cm to about 60 pS/cm. The electrical conductivity of one or both of the ink composition and the supernatant portion thereof may range between any combinations of the above-stated values, inclusive of the recited values, for example. In particular examples, the weight fraction of dispersant to pigment in the operable ink composition is sufficient to render the electrical conductivity of the ink equal to about 8 pS/cm, or about 11 pS/cm, or about 40 pS/cm, or about 45 pS/cm, or about 63 pS/cm, or about 121 pS/cm, or about 182 pS/cm or about 223 pS/cm.

In some examples, the electrical conductivity of the supernatant portion of the operable ink composition is less than 100 pS/cm and may range from about 5 pS/cm to about 95 pS/cm and depends in part on the amount and nature of the pigment particles and the amount and nature of dispersant and the nature of the interaction between the dispersant and the pigment in the oil-based dielectric carrier fluid. As provided above, the electrical conductivity of the operable ink composition may be greater than 100 pS/cm in some examples. For example, the electrical conductivity of the operable ink composition may be from about 10% to about twenty times more than the electrical conductivity of the supernatant portion. In another example, the electrical conductivity of the operable ink composition may be from about 10% to about ten times more than the electrical conductivity of the supernatant portion. In other examples, the electrical conductivity of the operable ink composition is also less than 100 pS/cm.

In some examples, the dispersant comprises a first dispersant and a second dispersant that is different from the first dispersant. One of the first and second dispersants may substantially provide steric stabilization while the other of the first and second dispersants may substantially provide charge stabilization. It has been empirically determined that SOLSPERSE® SP21000 (comprising a polyacid) dispersant and SOLSPERSE® SP9000 (comprising a polyamine) dispersant each create little charge in ISOPAR® dielectric carrier fluids and may be considered to provide more steric stabilization to pigment particles in solution. Also, other SOLSPERSE® SP dispersants included herein (i.e., 19000, 13940, 13300 and 11200) each may create considerable charge in ISOPAR® dielectric carrier fluids and may be considered to provide more charge stabilization to pigment particles in solution. Use of the various dispersants herein may be dependent on the particular pigment that is used.

In some examples, the first dispersant is an organic polyamine material and the second dispersant is an organic polyacid material and the ratio of the first dispersant to the second dispersant in the ink composition may range from about 0.1 to about 1. For example, the ratio of the first dispersant (e.g., organic polyamine) to the second dispersant (e.g., organic polyacid) in the ink composition may range from about 0.25 to about 1, or about 0.4 to about 1. In another example, the organic polyamine of the first dispersant is present in the ink composition at about 0.25 times the pigment weight (about 1% by weight for a pigment concentration of about 4% by weight) and the organic polyacid of the second dispersant is present in the ink composition at about 0.75 times the pigment weight (about 3% by weight for the pigment concentration of about 4% by weight). In this example, the ratio of the organic polyamine to the organic polyacid is about 0.33. Other weight percents and other ratios may be employed depending on the nature and amount of the particular pigment used, the dielectric carrier fluid used and the nature of the organic polyamine and the organic polyacid chosen for the first dispersant and the second dispersant of these embodiments.

It should be noted that in the examples that include both an organic polyamine and an organic polyacid as a first dispersant and a second dispersant, the polyamine and the polyacid are separate entities and are to be distinguished from a polymeric material having both organic polyamine and organic polyacid components such as a condensation polymer of an organic polyamine and an organic polyacid. The polyamine and polyacid may associate with each other through acid/base or Zwitterionic interactions but the association is not covalent as in the condensation polymer mentioned above. In other examples, some of the dispersants may include both an acid functionality and an amine functionality. For example, SOLSPERSE® SP9000 may have both functionalities, while SOLSPERSE® SP 11200 may have residual acid functionality but is primarily a polyamine A dispersant added to a dielectric carrier fluid in the absence of pigment may generate charge and electrical conductivity in proportion to the concentration of dispersant added. In particular, SOLSPERSE® SP dispersants 19000, 13940, 13300, 11200, 9000 and 21000 in ISOPAR® L dielectric carrier fluid were compared. The conductivity is proportional to the concentration of the dispersant for concentrations of from about 0.01% to about 10% by weight of the SP dispersants. The conductivity behavior indicates that SOLSPERSE® SP 13940, 13300, 19000 and 11200 dispersants form charged species in solution, whereas SOLSPERSE® SP 9000 and 21000 dispersants create negligible charge. The conductivity of SOLSPERSE® SP 13940, 13300, 19000 and 11200 dispersants at a concentration of about 1% by weight in the dielectric carrier fluid is between about 200 and about 1000 pS/cm. On the other hand, the conductivity of SOLSPERSE® SP 9000 and 21000 dispersants at the same concentration is less than 5 pS/cm.

Figure 2:
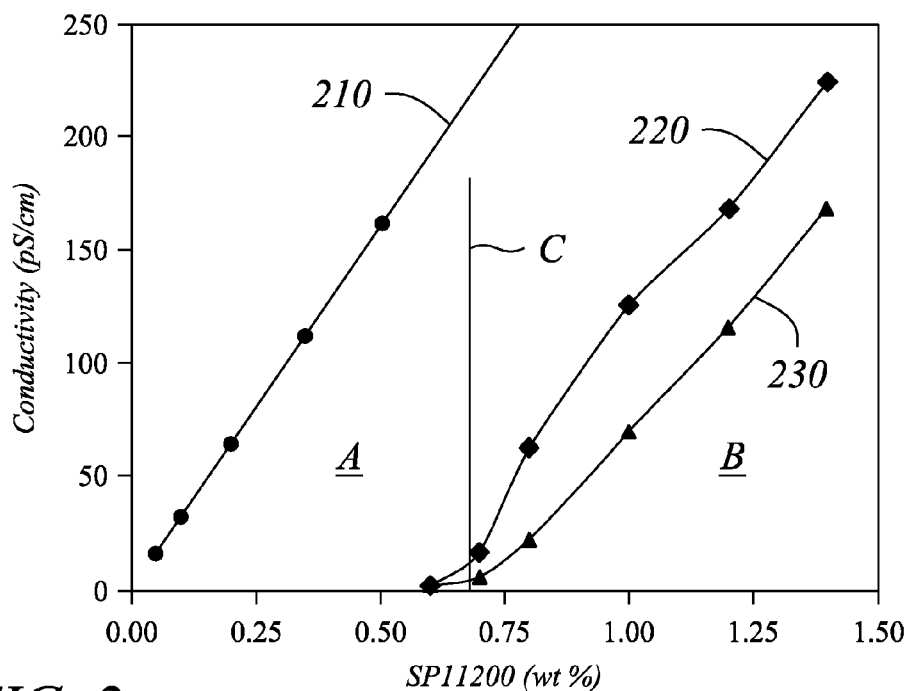
FIG. 2 illustrates a graph of effects that dispersant and pigment have on electrical conductivity of a dielectric carrier fluid, according to another embodiment.

FIGS. 1 and 2 illustrate graphs of effects that dispersant and pigment have on electrical conductivity in a dielectric carrier fluid, according to some embodiments. In FIG. 1, various amounts of SOLSPERSE® SP19000 (organic polyamine) dispersant in ISOPAR® L dielectric carrier fluid are compared to an ink dispersion comprising the same and milled HOSTAPERM® Yellow H5G10 pigment (a monoazo pigment), by way of example. A solution 110 comprises ISOPAR® L dielectric carrier fluid with added SOLSPERSE® SP19000 dispersant (from 0.1% up to 1.0% by weight of SP19000). The conductivity behavior of the solution 110 is illustrated in FIG. 1. For example, 0.1% (by weight) of SOLSPERSE® SP19000 dispersant in ISOPAR® L dielectric carrier fluid yields a solution conductivity of about 45 pS/cm, while 1.0% (by weight) of SOLSPERSE® SP19000 (ten times the amount) in ISOPAR® L yields a solution conductivity of about 450 pS/cm (ten times the conductivity). Charge may reside on inverse micelles or on individual molecules or ions in the respective solutions.

In some examples, addition of a pigment to a solution of the dielectric carrier fluid with a dispersant can change the conductivity in dramatic fashion. For example, an ink dispersion solution 120 comprises about 4% by weight of milled HOSTAPERM® Yellow H5G10 pigment added to an ISOPAR® L solution containing SOLSPERSE® SP 19000 dispersant. The conductivity behavior of the ink dispersion solution 120 with increasing amounts of the SOLSPERSE® SP19000 dispersant (starting from about 1.2% by weight of SP19000) is further illustrated in FIG. 1. As illustrated, adding about 4% by weight of HOSTAPERM® Yellow H5G10 pigment to a solution containing about 1.2% by weight of SOLSPERSE® SP19000 dispersant in dielectric carrier fluid reduced the conductivity from an approximate 550 pS/cm for the dispersant solution 110 to about 20 pS/cm for the ink dispersion solution 120. As such, interaction between the Yellow H5G10 pigment and the SP19000 dispersant substantially reduced charge in the ink dispersion solution 120 to a conductivity that is less than 100 pS/cm for dispersant concentrations less than or equal to about 1.7% by weight. A supernatant 130 of the ink dispersion solution 120 is also plotted with the ink dispersion solution 120 in FIG. 1. The supernatant 130 conductivity remains below 100 pS/cm for SP19000 dispersant concentrations up to about 2.25% by weight.

In FIG. 2, SOLSPERSE® SP11200 (organic polyamine) dispersant in ISOPAR® L dielectric carrier fluid is compared to an ink dispersion comprising the same and milled Toner Yellow HG pigment (a disazo pigment), by way of example. A solution 210 comprises ISOPAR® L dielectric carrier fluid with added SOLSPERSE® SP11200 dispersant (from about 0.1% up to about 0.5% by weight of SP11200). The conductivity increased from about 32 pS/cm to about 160 pS/cm over this concentration range. Charge generated by adding SP11200 to ISOPAR® L dielectric carrier fluid may reside on inverse micelles or on individual molecules or ions in the respective solutions, for example.

In some examples, addition of about 4% by weight of milled Toner Yellow HG pigment to solutions of ISOPAR® L dielectric carrier fluid with SOLSPERSE® SP11200 dispersant also changed the conductivity in dramatic fashion. FIG. 2 illustrates the conductivity behavior of the ink dispersion solution 220 with increasing amounts of the SOLSPERSE® SP11200 dispersant (starting from about 0.6% by weight of SP11200). Adding about 4% by weight of pigment to a dispersant solution containing about 0.8% by weight of SOLSPERSE® SP11200 reduced the solution conductivity from about 250 pS/cm for the dispersant solution 210 to about 63 pS/cm for the ink dispersion solution 220. Moreover, interaction between the Toner Yellow HG pigment and the SP11200 dispersant substantially reduced charge in the ink dispersion solution 220 to a conductivity that is less than 100 pS/cm for dispersant concentrations less than or equal to about 0.9% by weight. A supernatant 230 of the ink dispersion solution 220 is also plotted with the solution 220 in FIG. 2. The supernatant 230 conductivity remained below 100 pS/cm for SP11200 dispersant concentrations up to about 1.2% by weight.

The conductivity behavior of the ink dispersions described above and illustrated in FIGS. 1 and 2 are examples of how some pigment and dispersant combinations behave with increasing dispersant concentration. The conductivity of other ink dispersions may behave differently than the conductivity behavior of H5G10 pigment in SP 19000 dispersant and Toner Yellow HG pigment in SP11200 dispersant that are illustrated in FIGS. 1 and 2, respectively. The ink conductivity of an ink dispersion is highly dependent upon the choice of pigment and dispersant as well as the relative amounts thereof in the dispersion.

In some examples, a range of dispersant concentrations that controls the electrical conductivity of the ink composition to within the conductivities provided above may be determined empirically, especially when pigment surface chemistry is proprietary to the pigment manufacturer and dispersant chemistry is proprietary to the dispersant manufacturer. In some embodiments, the dispersant to pigment ratio tends to follow a trend. At low dispersant concentration there is insufficient dispersant to interact with all the pigment particle surfaces and therefore, the pigment particles tend to agglomerate and the particle size is less compatible (unstable size) with inkjet printing. For example, the ink composition (and its supernatant) exhibits low conductivity, since most of the dispersant is interacted with the pigment particle surfaces and contributes neither to an electric charge of the supernatant nor to pigment charge. See FIGS. 1 and 2, left side labeled A, for example.

As the dispersant concentration is increased, a point is reached (line C in FIGS. 1 and 2), herein called the 'threshold concentration' (as defined above), where substantially all of the pigment particle surface area is interacted with the dispersant (particle size is stably small, in that particles are deagglomerated and do not substantially reagglomerate). The electric charge density, and therefore the electrical conductivity, of the supernatant are still low at the threshold concentration. When the dispersant is added beyond the threshold concentration, un-interacted or free dispersant appears in the supernatant, which generates free charge and increases the supernatant conductivity (see FIGS. 1 and 2, right side labeled B, for example). In some examples, the targeted dispersant concentration may be the concentration (or range thereof) just beyond the threshold concentration, where substantially all pigment particles are interacted with the dispersant and some free dispersant is available to provide electrostatic stabilization of the ink composition. By 'electrostatic stabilization' it is meant that the pigment particles have a common sign of net charge and that the particles tend to repel one another. Electrostatically stabilized pigment particles remain deagglomerated for a period of time. Electrostatic stabilization is not related to and is not to be confused with the above-mentioned electrostatic ejection from an inkjet print head.

In the example in FIG. 1, the threshold concentration of the SP 19000 dispersant in the ink dispersion solution 120 was about 1.7% by weight of total solution weight (represented by the vertical line labeled C in FIG. 1) for Yellow H5G10 pigment. As illustrated, above the threshold concentration (side B), the ink conductivity of the ink dispersion solution 120 rose with a slope similar to the slope of the conductivity for the ISOPAR® L-SP19000 solution 110. Moreover, the dispersion was stable against agglomeration and sedimentation, for example the average particle size of pigment particles, as measured by DLS, was stably about 180 nm. However, below the threshold concentration (side A), the dispersion was not stable against agglomeration and sedimentation, for example the average particle size was greater than about 500 nm. Moreover, the conductivity of the supernatant 130 remained below 100 pS/cm when the ink conductivity was less than about 300 pS/cm in this example.

In the example in FIG. 2, the threshold concentration of the SP11200 dispersant in the ink dispersion solution 220 was about 0.7% by weight of total solution weight (represented by the vertical line labeled C in FIG. 2) for Toner Yellow HG pigment. Above the threshold concentration, the dispersion was stable against agglomeration and sedimentation, for example the average particle size of pigment particles, also as measured by DLS, was less than 230 nm. However, below the threshold concentration (side A), the dispersion was not stable against agglomeration and sedimentation, for example the average particle size was greater than about 1000 nm. Moreover, the conductivity of the supernatant 230 remained below 100 pS/cm when the ink conductivity was less than about 150 pS/cm in this example. For the purposes of the various embodiments herein, an ink composition having a dispersant concentration that is just above the threshold concentration has characteristics (e.g., low conductivity and stability against agglomeration) that are compatible with digital offset inkjet printing.

In some examples (not illustrated), the effect that other pigment and dispersant combinations have on electrical conductivity of ink solutions in a dielectric carrier fluid was evaluated. For example, the electrical conductivity behavior of SOLSPERSE® SP9000 organic polyamine/polyacid dispersant and Clariant Toner Magenta (TM) 6B VP2213 pigment (an azo pigment) was evaluated. Four solutions were prepared and their electrical conductivities were compared. In particular, ISOPAR® L dielectric carrier fluid was combined with about 6.6% by weight of SOLSPERSE® SP9000 dispersant in a first solution and a conductivity of about 30 pS/cm was measured. Moreover, the ISOPAR® L dielectric carrier fluid was combined with about 8.6% by weight of Toner Magenta 6B VP2213 pigment in a second solution and a conductivity of about 5 pS/cm was measured. It may be deduced from these data, by way of example, that the SOLSPERSE® SP9000 dispersant in the ISOPAR® L dielectric carrier fluid produces a low concentration of charged species, even at relatively high dispersant concentration. Moreover, it may be deduced from these data, by way of example, that the TM 6B VP2213 pigment in the ISOPAR® L dielectric carrier fluid does not acquire charge.

In addition, an ink dispersion was prepared as a third solution by adding about 8.6% by weight of TM 6B VP2213 pigment to the first solution containing about 6.6% by weight of the SOLSPERSE® SP9000 dispersant in the ISOPAR® L dielectric carrier fluid. The conductivity of the ink dispersion created was about 570 pS/cm, nearly a 20 fold increase over the conductivity of the first solution (i.e., without pigment). Dilution of the above mentioned ink dispersion with Isopar L to about 4% by weight of TM 6B VP2213 pigment and about 3.1% by weight of SOLSPERSE® SP9000 dispersant yields an ink conductivity of about 260 pS/cm, a value compatible with digital offset inkjet printing, in accordance with some examples.

Moreover, a fourth solution was prepared by centrifugation of the third solution (ink dispersion) to remove solid pigment particles from the solution and form a supernatant of the ink dispersion, for example. The conductivities of the first solution and the fourth solution (i.e., supernatant portions) were both about 30 pS/cm. It may be deduced from these results, by way of example, that the 20 fold increase in conductivity upon addition of TM 6B VP2213 pigment to the first solution (6.6% by weight of the SOLSPERSE® SP9000 dispersant in the ISOPAR® L dielectric carrier fluid) is not due to the supernatant (i.e., fluid matrix without pigment solids). Instead, the increase may be due to charge on the pigment particles, for example. Despite the relatively high conductivity of the ink dispersion (for example about 570 pS/cm for the third solution), the supernatant conductivity is significantly much lower (for example about 30 pS/cm for the fourth solution). In light of the low supernatant conductivity thereof, the ink dispersion formulated from TM 6B VP2213 pigment and SOLSPERSE® SP9000 dispersant, when rendered in an operable ink composition, is also compatible with digital offset inkjet printing, in accordance with some examples.

As provided above, in accordance with various examples herein, the ink composition comprises a supernatant portion (i.e., fluid matrix, without the pigment particles) and solids portion (i.e., pigment particles and interacted dispersant). In some examples, the supernatant of the ink composition has an electrical conductivity of less than 100 pS/cm while the electrical conductivity of the ink composition may or may not be greater than 100 pS/cm. For example, the electrical conductivity of the operable ink composition may be about 10% more than to about twenty times more than the electrical conductivity of the supernatant. In another example, the electrical conductivity of the operable ink composition may be about five times more than the electrical conductivity of the supernatant. Accordingly, the dispersed pigment particles may have charge and therefore, will contribute to the electrical conductivity of the operable ink composition, but not to the electrical conductivity of the supernatant of the operable ink composition, for example. The low supernatant conductivity renders the ink composition compatible with digital offset inkjet printing herein.

An example of an operable ink composition that meets the criteria for inkjet printing in a digital offset printing system comprises a quinoxalinedione-based monoazo yellow pigment dispersed with an organic polyamine dispersant. The dispersant has a weight fraction ranging from about 0.4 to about 0.45 of the pigment concentration in an isoparaffinic hydrocarbon solvent having low intrinsic conductivity. The operable ink composition has a supernatant conductivity that is less than about 50 pS/cm (measured on centrifuged supernatant) and an ink conductivity that is less than about 150 pS/cm at a viscosity of about 3 cP and an average particle size of less than about 200 nm, for example. At least the very low supernatant conductivity (e.g., about 50 pS/cm) renders the ink composition compatible with digital offset inkjet printing. The relatively low ink conductivity (i.e., less than or equal to about 300 pS/cm) further renders the ink composition compatible with digital offset inkjet printing.

Another example of an operable ink composition that meets the criteria for inkjet printing in a digital offset printing system comprises a quinoxalinedione-based monoazo yellow pigment dispersed with a first dispersant of an organic polyamine and a second dispersant of an organic polyacid (e.g., dispersants in a ratio ranging from about 0.3 to about 0.45) in an isoparaffinic hydrocarbon solvent having low intrinsic conductivity. A weight fraction of the total dispersant ranges from about 0.8 to about 1.0 of the pigment concentration, for example. The operable ink composition has an electrical conductivity ranging from about 40 and about 50 pS/cm at a viscosity of about 3 cP and an average particle size of less than about 250 nm, for example.

Another example of an ink composition that meets the criteria for inkjet printing in a digital offset printing system comprises an azo magenta pigment laked with calcium dispersed with a dispersant of an organic polyacid in an isoparaffinic hydrocarbon solvent having low intrinsic conductivity. A weight fraction of the dispersant ranges from about 0.35 to about 0.5 of the pigment concentration, for example. The operable ink composition has an electrical conductivity ranging from about 190 pS/cm to about 225 pS/cm at a viscosity of about 3 cP and a supernatant conductivity that is expected to be from at least three times less than the ink conductivity, for example. Moreover, the operable ink composition has an average particle size of less than about 250 nm. At least the low supernatant conductivity renders the ink composition compatible with digital offset inkjet printing. The ink conductivity being less than or equal to about 300 pS/cm further renders the ink composition compatible with digital offset inkjet printing.

Another example of an ink composition that meets the criteria for inkjet printing in a digital offset printing system comprises a benzimidazolone disazo pigment dispersed with a dispersant of an organic polyamine in an isoparaffinic hydrocarbon solvent having low intrinsic conductivity. A weight fraction of the dispersant less than about 0.22 of the pigment concentration, for example, provides an electrical conductivity of the operable ink composition of less than 100 pS/cm at a viscosity of about 3 cP and a supernatant conductivity less than about 50 pS/cm, for example. Moreover, the operable ink composition has an average particle size of less than 200 nm. The low electrical conductivities of either the ink or the supernatant portion of the ink render the ink composition compatible with digital offset inkjet printing.

Figure 3:
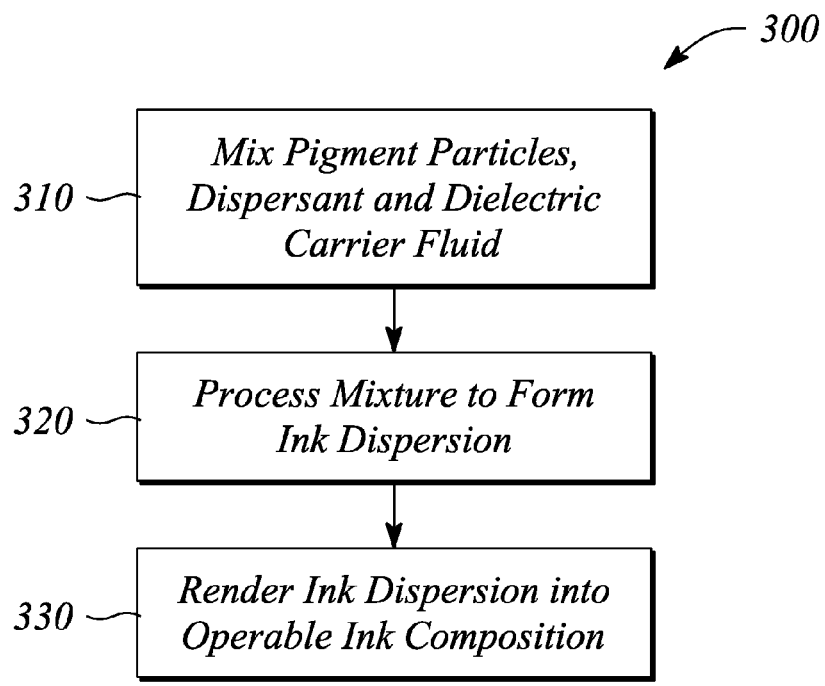
FIG. 3 illustrates a flow chart of a method of making an ink composition having controlled conductivity, according to an embodiment.

The ink composition having controlled conductivity in operable form, which is compatible with digital offset inkjet printing, may be made by a method 300 that is illustrated in FIG. 3 as a flow chart, according to an embodiment. In some examples, the manufactured ink composition has an electrical conductivity of less than or equal to about 300 pS/cm in operable form. In some examples, one or both of the operable form of the manufactured ink composition and a supernatant portion of the operable ink composition has an electrical conductivity of less than 100 pS/cm. In some examples, the manufactured operable ink composition is substantially equivalent to any of the examples of the operable ink composition described herein.

The method 300 comprises mixing 310 together a dielectric carrier fluid, a dispersant and pigment particles in respective amounts that are dependent on the particular pigment, dispersant and dielectric carrier fluid that are mixed. The dielectric carrier fluid is substantially oil-based, and the dispersant is oil-soluble and also compatible with the pigment particles. The ingredients are mixed 310 together by agitating using one or more of stirring, shaking, homogenizing and blending, or combinations of the above, for example, for a period of time that may range from about 5 minutes to about 16 hours, in order to make a mixture. Ambient temperature may be employed as the ingredients are mixed 310. One or more of an orbital shaker, a homogenizer, and a paint shaker may be used to mix 310 the ingredients. For example, a model 420 Form a orbital shaker from Thermo Scientific, Waltham, Mass. may be used. In another example, a model IKA T-25 Ultra-Turrax homogenizer from IKA, Staufen, Germany may be used. By way of example, the mixture of dielectric carrier fluid, dispersant and pigment may be shaken by a paint shaker for about 15 minutes and then mixed on an orbital shaker at about 150 rpm for about 16 hours prior to further processing. In another example, the mixture is also stirred with a homogenizer for 5 minutes before further processing.

In some examples, the amount and type of the dispersant in the mixture are determined experimentally for a particular pigment and depend in part on the amount and nature of the particular pigment that is used in the oil-based dielectric carrier fluid. In some examples, the amount and type of dispersant in the mixture are one or both of an a priori amount and an a priori type that are based on information regarding known characteristics of the particular pigment and the oil-based dielectric carrier fluid.

The method 300 further comprises processing 320 the mixture in a manner that deagglomerates the pigment particles in the oil-based dielectric carrier fluid and creates an ink dispersion. The mixture is processed 320 comprising one or more of bead milling, sonication, ultrasonication, high shear mixing and microfluidization, for example, to deagglomerate the pigment particles of the mixture and facilitate the dispersion. In particular, processing 320 mechanically promotes interaction between the dispersant and the surface of the pigment particles to form the dispersion. For example, the dispersant one or more of coats the surfaces of the pigment particles, chemically interacts with the surface of the pigment particles and physically interacts with the surface of the pigment particles.

In some examples, the mixture is processed 320 for a period of time that may range from about 10 minutes to about 180 minutes. In other examples, the period of time for processing 320 the mixture may range from about 15 minutes to about 80 minutes, or about 20 minutes to about 60 minutes. In some examples, a bead mill is used to process 320 the mixture. For example, a Kotobuki UAM-015 vertical rotary bead mill (Kotobuki Industries Co., LTD, Japan) may be used. In a representative example, a mixture containing about 15% by weight of pigment, dispersant and dielectric carrier fluid may be processed 320 for about 30 minutes using about 50 µm diameter Zirconia grinding media in a grinding chamber cooled to about 10° C. and operating at a rotor tip speed of about 9 m/s. The mixture is circulated through the mill at a flow rate of about 170 ml/minute, for example. In another example, a Fritsch Pulverisette 7 planetary mill (Fritsch GmbH, Idar-Oberstein, Germany) may be used. An example set of process conditions using a Fritsch mill includes a mixture of dispersant, dielectric carrier fluid and a pigment concentration of about 25% by weight. The mixture is processed 320 by rotating at maximum speed of about 800 rpm for a total mill time of about 80 minutes using 0.5 mm Zirconia grinding media, for example. The temperature may be maintained below about 50° C. during the process 320.

In some examples, the temperature while the mixture is processed 320 may range from about 10° C. to about 100° C. For example, the temperature during processing 320 the mixture may range from about 10° C. to about 60° C., or about 20° C. to about 50° C., or about 25° C. to about 40° C. The temperature may be constant while the mixture is processed 320 or the temperature may be varied either with a variation in agitation method or within one agitation method. In some examples, ambient temperature is employed while the mixture is processed 320 into the ink dispersion.

The method 300 of making further comprises rendering 330 the ink dispersion into an operable ink composition for jetting. Rendering 330 the ink dispersion comprises diluting the ink dispersion with oil-based carrier fluid such that the concentration of pigment particles ranges from about 1% to about 10% by weight and a total dispersant concentration is a weight fraction ranging from about 0.05 to about 1 of the pigment particle concentration. For example, the ink dispersion is diluted with an amount of ISOPAR® L or ISOPAR® V until the pigment concentration and total dispersant concentration is within the above-described ranges as the ink dispersion is rendered 330 into an operable ink composition.

Whether determined empirically or known a priori, the amount and type of the dispersant used in the particular ink composition are that which are sufficient to substantially reduce agglomeration of the pigment particles in the oil-based dielectric carrier fluid to create a stable dispersion. In some examples, the amount and type of the dispersant used in the particular ink composition are that which are sufficient to substantially prevent agglomeration of the pigment particles to create a stable dispersion. The dispersant either reduces or prevents agglomeration, for example, through one or both of charge (i.e., electrostatic) stabilization and steric stabilization upon completion of processing 320 the mixture.

In some examples, the sufficient amount of the dispersant is added at the start of or as the ingredients are mixed 310 together and the sufficient amount of the dispersant renders the mixture substantially dispersed upon completion of processing 320 the mixture. In other examples, less than the sufficient amount of the dispersant is added at the start of or during mixing 310 and additional dispersant is added after the mixture is processed 320 until the sufficient amount is reached. As such, in some examples (not illustrated in FIG. 3), the method 300 of making the ink composition may further comprise adding additional dispersant to the processed 320 mixture (before the ink dispersion is rendered 330 in operable form) until the sufficient amount of the dispersant is reached (just above a threshold concentration, for example, as described herein) to substantially disperse the mixture. By 'substantially disperse(d)' it is meant that the pigment particles remain in suspension in the dispersion solution for a period of time that may range from about 1 hour to about 1 month, or more, for example (i.e., a stable dispersion). The length of time that the dispersion remains substantially dispersed will depend on the particular example of the ink composition.

FIGS. 1 and 2 further illustrate examples of when additional dispersant is added after the mixture is processed 320 and when the threshold concentration is reached (a concentration level labeled C in FIGS. 1 and 2). For example, the additional dispersant is added either until or as long as a concentration of the dispersant is less than about 1.5 times the threshold concentration of dispersant. Side B in FIGS. 1 and 2 is representative of dispersant concentration above the threshold concentration where the electrical conductivity of one or both of ink composition and the supernatant thereof begins to rise in proportion to an amount of the dispersant added above the threshold concentration, by way of example.

In some examples, the dispersant may comprise a first dispersant and a second dispersant that is different from the first dispersant. For example, both the first dispersant and the second dispersant may be added in a sufficient amount at the start of or as the ingredients are mixed 310 together and then the mixture is processed 320 in accordance with the method 300. However, in another example, the first dispersant is added in an amount that is less than the sufficient amount at the start of or as the ingredients are mixed 310 and the mixture is processed 320. Using slightly less of the first dispersant at the start of mixing 310, provides for deagglomeration with the first dispersant predominantly through steric stabilization rather than electrostatic stabilization (or a combination of steric and charge stabilization), for example. In this example, the method 300 of making further comprises adding the second dispersant (not illustrated in FIG. 3) to the processed 320 mixture either until or as long as a concentration of the second dispersant is less than about 1.5 times a threshold concentration of dispersant above which the electrical conductivity of one or both of the ink composition and the supernatant begins to rise in proportion to an amount of the second dispersant added above the threshold concentration. Using a second dispersant that is different from the first dispersant provides for stabilization with the second dispersant predominantly electrostatically through the addition of charge as the mixture is processed 320 into the ink dispersion, for example.

For example, the organic polyamine dispersants SOL-SPERSE® 19000 or SOLSPERSE® 11200, or the organic polyamine/polyacid dispersant SOLSPERSE® 9000 may individually provide the stabilization to the ink dispersion either electrostatically or a combination of sterically and electrostatically. In another example, the first dispersant may be the organic polyacid dispersant SOLSPERSE® 21000 to substantially provide steric stabilization and the second dispersant may be the organic polyamine dispersant SOLSPERSE® 19000 to substantially provide charge stabilization to the ink composition.

The rendered 330 operable ink composition exhibits the electrical conductivity criteria described herein according to the various examples. As provided above, an electrical conductivity criterion includes the electrical conductivity of the operable ink composition being less than or equal to about 300 pS/cm, for example. In another example, an electrical conductivity criterion includes the electrical conductivity of the operable ink composition being less than 100 pS/cm. In another example, an electrical conductivity criterion includes the electrical conductivity of the supernatant portion of the operable ink composition being less than 100 pS/cm, while the electrical conductivity of the operable ink composition may or may not be less than 100 pS/cm.

Some other characteristics of the ink composition include, but are not limited to, an average particle size of the dispersed pigment particles less than or equal to about 300 nm, a viscosity of between about 2 and about 15 cP, a pigment concentration between about 1% and about 10% by weight, and a weight fraction of the dispersant to the pigment weight between about 0.05 and about 1. In some examples, a concentration of the dispersant is less than about 1.5 times a threshold concentration of dispersant.

In some examples, the completion of processing 320 the mixture or adding additional dispersant to make the operable ink composition is determined comprising periodically removing a sample of the ink dispersion and diluting the sample to measure the electrical conductivity of the sample. The particle size of the pigment particles in the sample upon dilution may also be measured. For example, the sample may be removed anywhere from about every 5 minutes to about every 20 minutes for measurements as the ink dispersion is created. Alternatively, or in addition, the sample may be removed for measurements after adding additional dispersant, for example, to determine whether the above electrical conductivity criteria are approached. In some examples, when the electrical conductivity (of either the ink dispersion or the supernatant thereof) of the sample meets an operable range described above, either processing 320 of the mixture or adding additional dispersant to the ink dispersion is ceased. In some examples, when the average particle size also reaches the operable range, the processing is ceased and the ink dispersion is rendered 330 into the operable ink composition.

For example, the removed sample is diluted with a dielectric carrier fluid to achieve a targeted concentration of pigment for measurements (for example, about 0.1% of pigment by weight for particle size measurements, and about 4% by weight of pigment for electrical conductivity measurements). The electrical conductivity is inversely proportional to the viscosity, so increasing the viscosity upon dilution decreases the electrical conductivity. The viscosity of the ink dispersion may be varied between about 2 centi Poise (cP) and about 15 cP for sample measurements using one or both of ISOPAR® V (having a room temperature viscosity of 12.2 cP) and ISOPAR® L (having a room temperature viscosity of 1.2 cP) dielectric carrier fluids, for example. The electrical conductivity may be measured using a Scientifica Model 627 conductivity meter (Scientifica Co., Princeton, N.J.), for example. The particle size of the pigment may be measured by dynamic light scattering using a Malvern Zetasizer® from Malvern Instruments Ltd., Worchestershire, UK, for example. The viscosity may be measured using a HAAKE CV100 rheometer (Thermo Fisher Scientific, Waltham Mass.), for example.

As provided above, the ink composition achieves operable form for jetting when the electrical conductivity of one or both of the ink composition and the supernatant portion thereof meets one of the above electrical conductivity criteria. Moreover, the pigment of the operable ink composition has an average particle size equal to or less than about 300 nm, and the viscosity of the operable ink composition ranges from about 2 cP to about 15 cP, for example. In some examples, the ink composition is in operable form for jetting, for example jetting using a digital offset inkjet printing system, when the electrical conductivity of the ink composition is less than or equal to about 300 pS/cm. In some examples, the supernatant portion of the operable ink composition has an electrical conductivity less than 100 pS/cm, or in other examples, both the operable ink composition and the supernatant portion thereof have an electrical conductivity less than 100 pS/cm. In some examples, the amount (concentration) of pigment particles ranges from about 1% to about 10% by weight and a total dispersant concentration is a fraction ranging from about 0.05 to about 1 of the pigment particle concentration in the operable ink composition.

A period of time during which the ink composition maintains a dispersion of the pigment particles depends on the nature of the dielectric carrier fluid, the nature of the dispersant, the nature of the pigment, and environmental conditions (e.g., storage temperature), for example. In some examples, an acceptable dispersion level may be achieved at a time just prior to jetting the ink composition to a surface for inkjet printing and in particular, for digital offset inkjet printing. For example, an inkjet print head may comprise an agitator or means for agitating (i.e., a shaking mechanism) under the control of a controller to disperse the pigment particles prior to ejection from nozzles of the inkjet print head. In other examples, the ink composition may remain at least about 50% dispersed to about 100% dispersed with pigment particles for a period ranging from about 1 day to about 100 days, for example. In another example, the ink composition may remain at least about 85% dispersed for at least 10 days.

As mentioned above, a particular dispersant or a combination of dispersants and a dielectric carrier fluid are selected based on one or more of having compatible solubility, compatibility with the pigment chemistry, and their respective potential contribution to the electrical conductivity of the operable ink composition. Thus, the process of selection of the appropriate components of the ink composition for the various examples herein may be carried out empirically, or may be selected based on a priori knowledge of one or more of the components.

Figure 4:
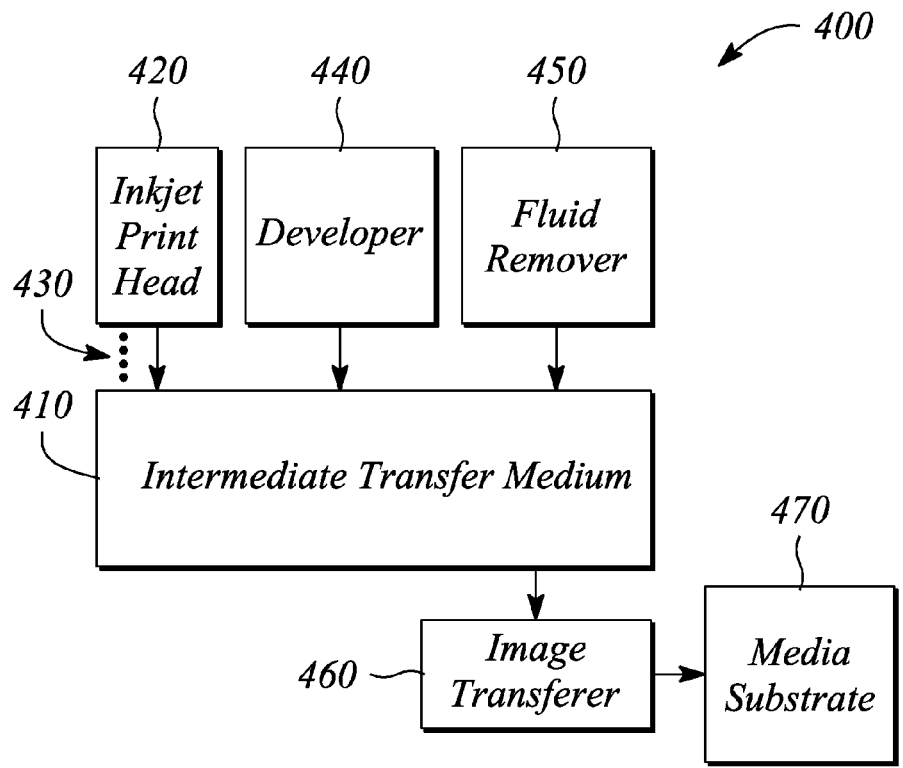
FIG. 4 illustrates a block diagram of a digital printing system, according to an embodiment.

A digital printing system 400, which is illustrated as a block diagram in FIG. 4, according to an embodiment is used to print an ink, for example the operable ink composition according to any of the examples described herein. The digital printing system 400 employs inkjet printing in an offset printing arrangement. The digital printing system 400 comprises a transfer medium 410, an inkjet print head 420, and an operable ink 430. The inkjet print head 420 is to nonelectrostatically jet the ink 430 to the transfer medium 410. The operable ink 430 has an electrical conductivity of less than or equal to about 300 pS/cm, for example. In another example, the electrical conductivity of one or both of the ink 430 and a supernatant portion of the operable ink 430 is less than 100 pS/cm.

The inkjet print head 420 comprises a plurality of nozzles that nonelectrostatically eject a plurality of droplets of the ink 430 to a surface of the transfer medium 410 in different locations in order to form an image. For example, a control device may be used to control ejection from the plurality of nozzles of the inkjet print head 420 in response to image processing data supplied to the control device to form an image with the ink 430 on the transfer medium 410. In some examples, the inkjet print head 420 is a piezoelectric inkjet print head that accommodates the oil-based ink 430. For example, a Dimatix Q-class piezoelectric inkjet print head (Fujifilm Dimatix Inc., Santa Clara, Calif.) may be used.

The transfer medium 410 is substantially an intermediate transfer substrate, for example, a belt, a surface of a drum or other means for receiving and then transferring to a media substrate 470 the image formed with the ink 430. The transfer medium 410 may be referred to as a 'blanket' herein without intent to limit the scope of the transfer medium 410. In some examples, the transfer medium 410 is to be electrically grounded. The transfer medium 410 may comprise one or more layers (not illustrated), for example a release layer, a soft layer and a base layer that have various characteristics that facilitate transferring the image formed by the ink 430 onto the media substrate 470. For example, the transfer medium 410 may comprise a transferrable binding polymer layer at the surface of the transfer medium 410. The polymer layer is positioned between the transfer medium 410 surface and the developed pigment on the surface, and may be deposited on the surface of the transfer medium 410 as part of the printing process, for example. The polymer layer, which is transferred to the media substrate 470 along the pigmented image, for example, facilitates transfer of the developed pigment to the media substrate 470 and improves adhesion of the developed pigment to the media substrate 470.

The digital printing system 400 further comprises a development system or developer 440 that provides means 440 for developing the ink 430 on the transfer medium 410 before transfer to the media substrate 470. In some examples, the means 440 for developing comprises an energy source that imparts an electrical force (e.g., an electric field or electric charge) to the ink 430 that is deposited on the transfer medium 410 from the inkjet print head 420. In some examples, the means 440 for developing imparts optical radiation or another energy source in addition to the electrical force mentioned above. The development system is to facilitate an electrostatic attachment ('fixing') of the ink 430 to the transfer medium 410. For example, the developer 440 facilitates pigment particle cohesion and pigment particle adhesion to the transfer medium 410. In particular, the developer 440 imparts charge on the pigment particles of the ink 430 such that the pigment particles cohere to each other and adhere to the transfer medium 410 (i.e., to substantially fix the pigment particles in an image to the surface of the blanket 410). In effect, the pigment particles are pulled toward the blanket 410 due to an electric field created by the developer 440 to substantially separate the pigment particles from the fluid or supernatant. In some examples, electrically grounding the blanket 410 facilitates fixing the pigment particles to the surface.

The energy source of the means 440 for developing comprises a charge generator or charge source, for example. Various charge generators including, but not limited to, one or more of corona based devices (e.g., Corotron or Scorotron) and Dielectric Barrier Discharge (DBD) based devices (e.g., a charge rod or an ion head), for example, may be used. Corona based devices are useful for injecting charge at atmospheric pressure, for example, and in some examples, may be one or more of wire, pin and edge based devices. In some examples, the DBD based devices may be more efficient in terms of charge deposition than corona based devices, which could be important at higher speeds, for example. Representative operating conditions for a corona based charge generator may include a corona wire set at about 6000V, the transfer medium set at ground, a corona current of about 5 uA/cm to flow between the corona generator and transfer medium, and a corona wire voltage to produce positive or negative corona current; wherein either sign of charge may be used to develop the image onto the transfer medium surface, for example.

The development of the ink particles, or i.e., the cohesion and adhesion characteristics of the developed ink particles to a surface, may be measured experimentally using a laser-based optical absorption technique that is described in detail in an article of Henryk Birecki and Thomas C. Anthony entitled "Evanescent Wave Based System for Observation of Injected Charge and Field Induced Electrophoresis," Proceedings of NIP25: International Conference on Digital Printing Technologies, 699 (2009), for example. The technique uses interaction of evanescent light waves with ink particles in a liquid to observe accumulation and stability of the particles at and in a vicinity of the surface. For example, evanescent wave absorption may be monitored adjacent to an Indium Tin Oxide (ITO) coated glass slide affixed to a high index prism. The particles are exposed to free charge injected into the system from a charge generator (e.g., a corona based generator). Electrophoretic motion of the ink particles to the surface and adhesion of ink particles to the surface are evaluated by monitoring evanescent wave absorption.

Figure 5A:
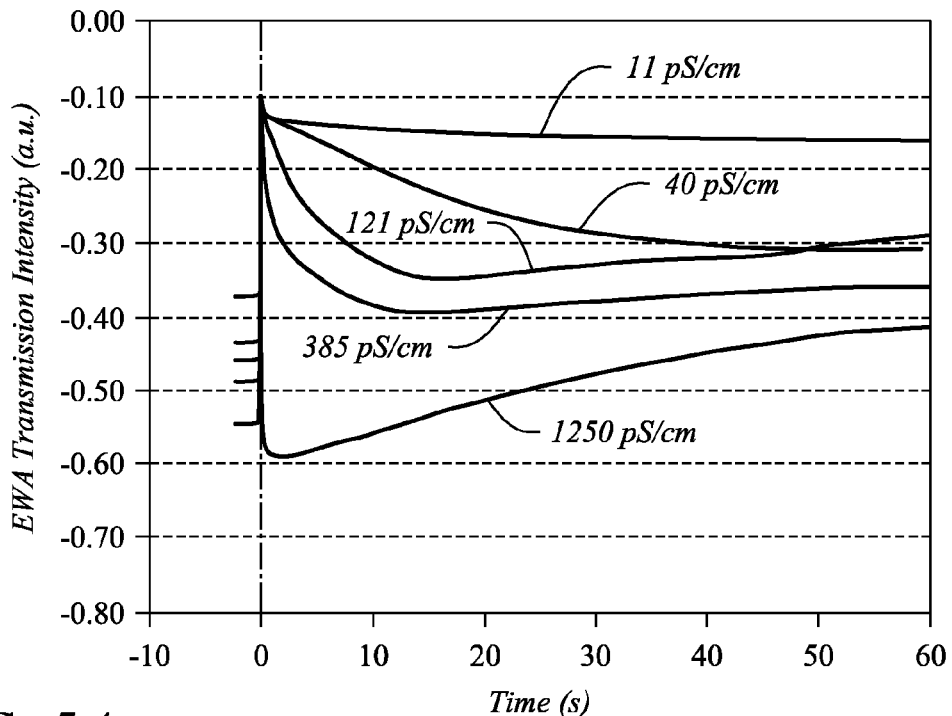
FIGS. 5A and 5B illustrate graphs of evanescent wave absorption (EWA) data for example ink compositions, according to an embodiment.
Figure 5B:
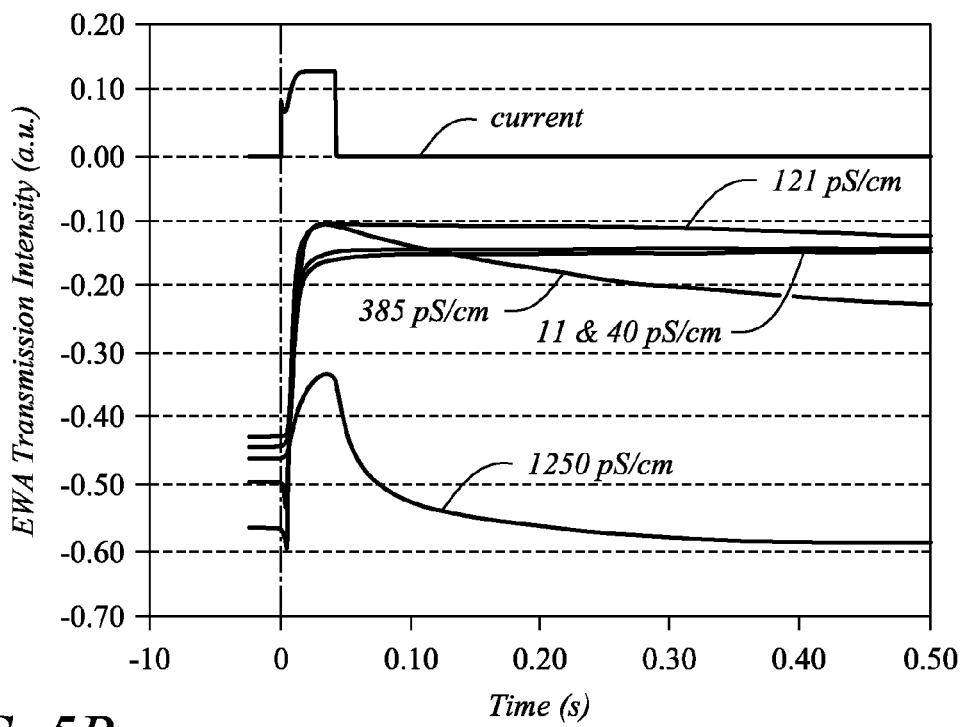

FIGS. 5A and 5B illustrate graphs of evanescent wave absorption (EWA) data measured during corona exposure of example ink compositions comprising Clariant Toner Magenta 6B pigment and SOLSPERSE® SP21000 and SP11200 dispersants in ISOPAR® L carrier fluid. Optical signals in a form of transmitted light intensity (EWA Transmission Intensity, a.u.) are plotted as a function of time for five Clariant Toner Magenta 6B pigment ink composition samples having electrical conductivities of about 11 pS/cm, about 40 pS/cm, about 121 pS/cm, about 385 pS/cm and about 1250 pS/cm. At time t=0 s in FIG. 5A, an about 45 millisecond (ms) duration corona pulse was directed onto the ink samples. Absorption increased instantaneously as charged pigment in the samples was electrostatically attracted to the ITO coated glass substrate (mentioned above). After the corona impulse, absorption decreased (transmission increased) as the pigment was released from the glass substrate. The rate that the pigment released from the glass substrate increased monotonically with the increasing conductivity of the samples. For example, the EWA transmission intensity (or 'EWA' for simplicity of discussion) of the 1250 pS/cm sample dropped the most after the pulse, to about −0.60 a.u. within 2 seconds, while the EWA of the 11 pS/cm sample decreased only to about −0.14 a.u. after about 60 seconds. The behavior of the other samples fell between the behavior of the 11 pS/cm sample and the 1250 pS/cm sample. The higher the EWA after the pulse, the more the pigment remained attached to the ITO coated glass substrate. For the digital offset inkjet printing platform embodiments herein, the behavior of the ink samples during about the first second after development (e.g., corona discharge), for example, may be of particular interest. During about the first second after development, fluid is removed from the jetted and developed ink on the transfer medium. It is during this time that the cohesion and adhesion characteristics of the pigment particles to the transfer medium affect subsequent image quality. After about the first second, the deposited ink composition is transferred to the media substrate.

The graph in FIG. 5B expands the time axis to show what happens during the first 500 ms after corona exposure. The absorption of the samples having the three lowest conductivities (11 pS/cm, 40 pS/cm and 121 pS/cm) remain nearly flat for the 500 ms duration after the pulse, indicating pigment retention on the ITO glass substrate. The reduction in absorption for the two highest conductivity samples (385 pS/cm and 1250 pS/cm) show that some pigment was released from the glass substrate within 500 ms, albeit much more for the 1250 pS/cm sample than the 385 pS/cm sample. A loss of pigment retention to the ITO glass substrate is equivalent to a loss of pigment from the intermediate transfer medium 410 in a digital offset inkjet printing system, as described above. Pigment loss on the intermediate transfer medium leads to a decrease in optical density of the transferred image and lower image quality. The EWA data illustrate that low conductivity ink compositions, for example ink electrical conductivity less than or equal to about 300 pS/cm, are more compatible with a digital offset inkjet printing platform as illustrated by pigment retention during corona development.

Figure 6:
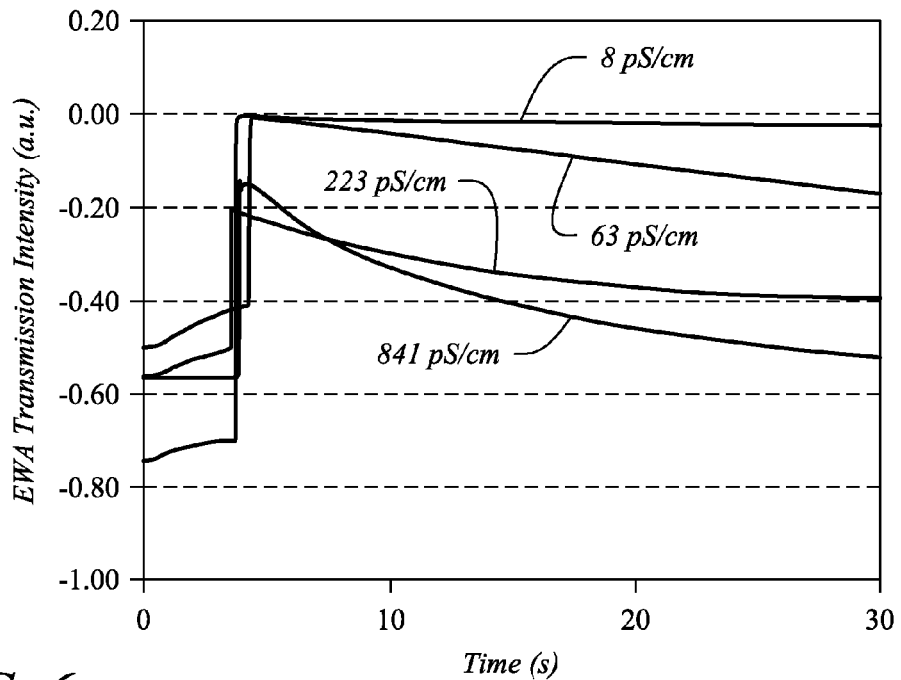
FIG. 6 illustrates a graph of evanescent wave absorption (EWA) data for example ink compositions, according to another embodiment.

A second example of evanescent wave absorption data measured during corona exposure is presented in FIG. 6 for ink compositions comprising Clariant Toner Yellow HG pigment and SOLSPERSE® SP 11200 dispersant in ISOPAR® L carrier fluid. Optical signals in a form of transmitted light intensity (EWA Transmission Intensity a.u.) are plotted as a function of time for four Clariant Toner Yellow HG pigment ink composition samples having electrical conductivities of about 8 pS/cm, about 63 pS/cm, about 223 pS/cm, and about 841 pS/cm. As illustrated in FIG. 6, at a time of approximately 3 seconds, an approximate 45 ms duration corona pulse was activated to direct charge onto a thin layer of the ink sample on the ITO coated glass substrate. Absorption abruptly increased as charged pigment was electrostatically attracted to the substrate. After the corona impulse, absorption decreased as pigment was released from the substrate. The rate of pigment release increased as ink conductivity increased. For example, during the initial few seconds, little or no pigment was released from the substrate for the 8 pS/cm and 63 pS/cm conductivity ink samples, whereas the 223 pS/cm and 841 pS/cm conductivity ink samples showed appreciable loss of pigment in the same period of time. The EWA data for these ink samples further illustrate that the low conductivity ink compositions, for example ink electrical conductivity less than or equal to about 200 pS/cm, are more compatible with a digital offset inkjet printing platform, as illustrated by pigment retention during corona development.

Referring back to FIG. 4, properties of the ink composition 430 may further minimize image degradation during printing, for example. An ink composition 430 in operable form having low electrical conductivity of less than or equal to about 300 pS/cm, or less than or equal to about 200 pS/cm, or less than or equal to about 100 pS/cm, for example, does not provide impetus for electrical conduction by mobile charged species in the dielectric carrier fluid. The same may be said for an operable ink composition 430 where the supernatant portion of the operable ink composition 430 has low electrical conductivity of less than 100 pS/cm, while the electrical conductivity of the ink composition 430 may be greater than or less than 100 pS/cm. Such electrically conducting species tend to discharge the charged ink particles developed onto the blanket surface and allow the pigment particles to migrate from the blanket 410 before transfer to the media substrate 470. For example, the low electrical conductivity of the supernatant of the ink composition 430 in operable form may even substantially prevent such discharge and associated image degradation. In addition, properties of the dispersant-interacted pigment particles of the operable ink composition 430 facilitate both cohesion between pigment particles and adhesion of the pigment particles to the transfer medium 410 upon directed exposure of energy from the developing means 440, as provided above. For example, one or both of such cohesion and adhesion may be a result of chemical interaction(s) involving bonds that are broken by the energy source of the developing means 440. In some examples, the electrical conductivity of the operable ink composition 430 being less than about 300 pS/cm, or less than about 200 pS/cm, or less than about 100 pS/cm further facilitates the pigment particle cohesion and adhesion and the reduction or prevention of such discharge.

The digital printing system 400 further comprises a fluid remover system or remover 450 that provides means 450 for removing at least a portion of the dielectric carrier fluid and the free dispersant of the jetted ink composition 430 from the fixed pigment particle deposited on the transfer medium 410. Hereinafter, the dielectric carrier fluid and the free dispersant will be referred to as the 'supernatant' for simplicity of discussion (the supernatant being a liquid). For example, the means 450 for removing comprises one or more of an air knife, a roller and a squeegee to physically or mechanically remove at least a portion of the supernatant from the transfer medium 410, for example. In another example, the means 450 for removing may further comprise one or both of a fan and a heater to evaporate some excess supernatant and possibly dry the fixed pigment particles on the surface of the blanket 410, for example.

The digital printing system 400 further comprises a transfer system or transferer 460 that provides means 460 for transferring an image to a media substrate 470, wherein the image comprises the fixed pigment particles from the transfer medium 410. In some examples, the means 460 for transferring comprises a counter roller and one or more of heat, electrical charge and pressure to facilitate transfer of the image to the media substrate 470. The counter roller may support the substrate 470 and may move the substrate 470 into contact (either direct or indirect) with the fixed pigment particles of the image on the transfer medium 410. In some examples, a combination of at least pressure and heat transfers the image to the media substrate 470 on the counter roller. The media substrate 470 includes, but is not limited to, various paper materials, plastics, metals, laminates and combinations of any of these, in a variety of forms including, but not limited to, a sheet, a roll and other suitable forms.

In some examples, for deposition of the ink 430 from a piezoelectric inkjet print head 420, the operable ink 430 has a viscosity that ranges from about 2 cP to about 15 cP and a surface tension of about 30 dynes/cm, for example. For example, the viscosity may range from about 4 cP to about 10 cP, or about 3 cP to about 5 cP, or from about 5 cP to about 8 cP, or from about 8 cP to about 12 cP. Moreover, the viscosity of the operable ink 430 may range between any of the above stated ranges, for example. The average particle size of the pigment particles in the operable ink 430 is less than 300 nm. For example, the average particle size may range from about 50 nm to about 300 nm, or from about 75 nm to about 275 nm, or from about 100 nm to about 260 nm, or from about 150 nm to about 290 nm. Moreover, the average particle size may range between any of the above stated ranges, for example. In some examples, the ink 430 is dispersed (e.g., substantially no sedimentation) at time of jetting. Further, for development, the jetted ink 430 has an electrical conductivity that is less than or equal to about 300 pS/cm, for example, and the jetted ink 430 has sufficient particle cohesion and adhesion to the transfer medium 410. In some examples, the transfer medium 410 comprises a binding polymer layer to facilitate development and transfer. Further for fluid removal, the supernatant of the ink 430 may have a viscosity that is less than about 10 cP, for example. Further for image transfer, the pigment particles of the ink 430 may comprise a polymer binder to facilitate transfer and adhesion to the media substrate 470.

Figure 7:
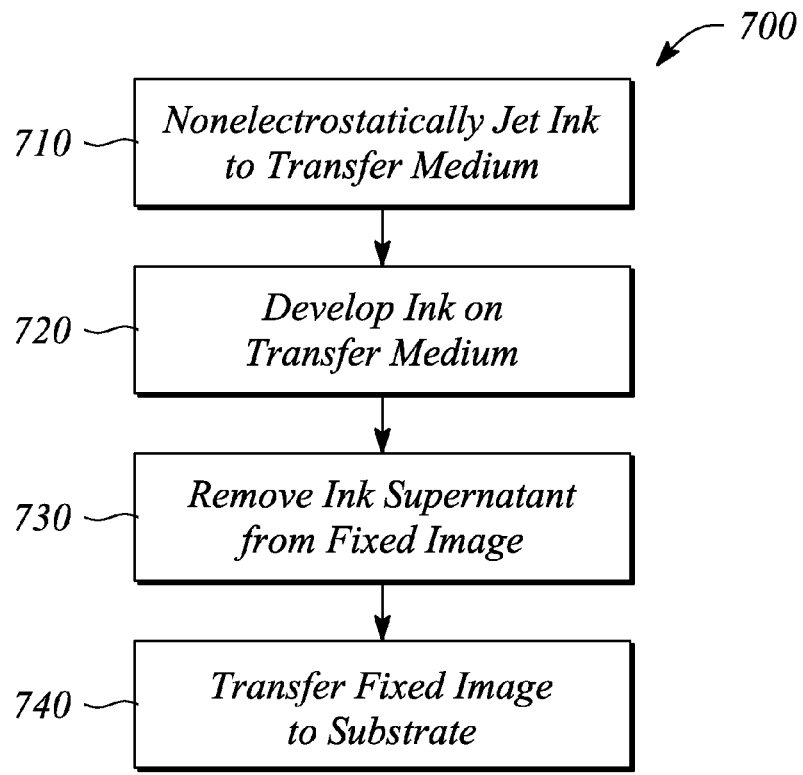
FIG. 7 illustrates a flow chart of a method of printing an ink composition having controlled conductivity, according to an embodiment.

A method 700 of printing an operable ink herein is illustrated as a flow chart in FIG. 7, according to an embodiment. The method 700 of printing comprises nonelectrostatically jetting 710 the operable ink, for example the ink composition according to any of the examples herein, from an inkjet print head onto a transfer medium (i.e., an intermediate movable blanket). Nonelectrostatically jetting 710 the ink comprises ejecting the ink from a piezoelectric inkjet print head, for example. In some examples, a binding polymer layer is applied to the intermediate transfer medium prior to nonelectrostatically jetting 710 the ink.

The method 700 of printing further comprises developing 720 the ink on the transfer medium such that pigment particles from the ink are fixed to the transfer medium in an image. In some examples, develop 720 the ink comprises electrically grounding the transfer medium. In some examples, the pigment particles from the ink are fixed to a binding polymer layer, when present, on the transfer medium. In some examples, a ratio of dispersant to pigment particles in the dielectric carrier fluid of the operable ink is sufficient to cause the pigment particles to cohere to each other and adhere to a surface of the transfer medium in response to development 720 of the ink. In particular, the ratio of dispersant to pigment particles affects the electrical conductivity of the ink, such that the electrical conductivity of the ink is less than or equal to about 300 pS/cm, for example. In some examples, the ratio is such that the electrical conductivity of one or both of the operable ink and a supernatant portion of the ink composition is less than 100 pS/cm. In some examples, the binding polymer layer facilitates development 720 of the pigment particles on the transfer medium. Developing 720 the ink comprises directly exposing the ink on the transfer medium to an electric field or an electric charge, for example. The directed exposure facilitates the cohesion of the pigment particles to each other and the adhesion of the pigment particles to the transfer medium surface.

The method 700 of printing further comprises removing 730 a portion of the supernatant (i.e., free dispersant and dielectric carrier fluid) from the fixed pigment particles on the surface of the transfer medium. The low electrical conductivity of the ink facilitates removal 730 of the portion of supernatant without degrading the fixed image. In some examples, the low electrical conductivity of the supernatant portion facilitates removal 730 of the portion of the supernatant without degrading the fixed image.

The method 700 of printing further comprises transferring 740 the image of fixed pigment particles to a media substrate. In some examples, one or more layers (e.g., a release layer, a soft layer and a base layer) on the transfer medium facilitate transfer 740 of the fixed pigment to the media substrate. A material of the media substrate may range from various paper materials to various plastics or metals, for example and includes a sheet and a roll of such materials. In some examples, the method 700 of printing the operable ink uses the digital printing system 400 described above.

Definitions:

The following provides definitions for terms and phrases used above, which were not previously defined. Further, additional information for some previously described terms are provided below.

The term 'alkane' as used herein means a branched (iso-, tertiary (neo), unbranched, or cyclic saturated hydrocarbon. An 'isoalkane' is a branched chain alkane whose next-to-last carbon atom is bonded to a single methyl group. A 'neoalkane' or 'tertiary alkane' is a branched chain alkane whose next-to-last carbon atom is bonded to two methyl groups.

The term 'substituted' means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, and thioaryl.

The term 'heteroatom' as used herein means nitrogen, oxygen, phosphorus or sulfur. The term 'heterocyclic' means having an alicyclic or aromatic ring structure, which includes one or more heteroatoms.

The term 'aromatic' as used herein includes monocyclic rings, bicyclic ring systems, and polycyclic ring systems, in which the monocyclic ring, or at least a portion of the bicyclic ring system or polycyclic ring system, is aromatic (exhibits, e.g., $\pi$-conjugation). The monocyclic rings, bicyclic ring systems, and polycyclic ring systems of the aromatic ring systems may include carbocyclic rings and/or heterocyclic rings. The term 'carbocyclic ring' denotes a ring in which each ring atom is carbon. The term 'heterocyclic ring' denotes a ring in which at least one ring atom is not carbon and comprises 1 to 4 heteroatoms.

The term 'alkyl' as used herein means a branched, unbranched, or cyclic saturated hydrocarbon group. Alkyls include, but are not limited to, methyl, ethyl, n-propyl, isopropyl, n-butyl, isobutyl, t-butyl, octyl, and decyl, for example, as well as cycloalkyl groups such as cyclopentyl, and cyclohexyl, for example.

The term 'alkenyl' as used herein means a linear, branched or cyclic hydrocarbon group containing at least one double bond, such as ethenyl, n-propenyl, isopropenyl, n-butenyl, isobutenyl, octenyl, decenyl, tetradecenyl, hexadecenyl, eicosenyl, and tetracosenyl, for example.

The term 'alkynyl' as used herein means a linear, branched or cyclic hydrocarbon group containing at least one triple bond, such as ethynyl, n-propynyl, isopropynyl, n-butynyl, isobutynyl, octynyl, decynyl, tetradecynyl, hexadecynyl, eicosynyl, and tetracosynyl, for example.

The term 'alkoxy' as used herein means an alkyl group bound to another chemical structure through a single, terminal ether linkage.

The term 'alkenoxy' as used herein means an alkenyl group bound to another chemical structure through a single, terminal ether linkage.

The term 'alkynoxy' as used herein means an alkynyl group bound to another chemical structure through a single, terminal ether linkage.

The term 'thioalkyl' as used herein means an alkyl group bound to another chemical structure through a single, terminal thio (sulfur) linkage.

The term 'thioalkenyl' as used herein means an alkenyl group bound to another chemical structure through a single, terminal thio (sulfur) linkage.

The term 'thioalkynyl' as used herein means an alkynyl group bound to another chemical structure through a single, terminal thio (sulfur) linkage.

The term 'aryl' means a group containing a single aromatic ring or multiple aromatic rings that are fused together, directly linked, or indirectly linked (such that the different aromatic rings are bound to a common group such as a methylene or ethylene moiety). Aryl groups include, for example, phenyl, naphthyl, anthryl, phenanthryl, biphenyl, diphenylether, diphenylamine, and benzophenone.

The term 'aryloxy' as used herein means an aryl group bound to another chemical structure through a single, terminal ether (oxygen) linkage. The term 'phenoxy' as used herein is aryloxy wherein aryl is phenyl.

The term 'thioaryl' as used herein means an aryl group bound to another chemical structure through a single, terminal thio (sulfur) linkage. The term 'thiophenyl' as used herein is thioaryl wherein aryl is phenyl.

The term 'percent (%) dispersed' or 'a percentage of particles dispersed' is defined as a ratio of the weight of pigment particles remaining in suspension to the total weight of pigment particles added to the solution mixture. The level of dispersion may be measured as degree of sedimentation, which is the complement of the percentage of dispersed particles. A level of sedimentation may be approximated by observation of the amount of solids collecting at the bottom of the storage vessel.

The term 'organic polyamine' as used herein also includes within its scope polyamines having a molecular weight (amu) of at least about 80 atomic mass units (amu), or at least about 800 amu, or at least about 900 amu, or at least about 1000 amu, or at least about 2000 amu, or at least about 3000 amu, or at least about 4000 amu, or at least about 5000 amu, or at least about 10,000 amu, or at least about 50,000 amu, or at least about 100,000 amu, for example. The organic polyamine has at least about 3, or at least about 4, or at least about 5, or at least about 6, or at least about 7, or at least about 8, or at least about 9, or at least about 10 amine groups, for example. The polyamine is about 1 to about 10,000 monomer units or more in length, or about 10 to about 10,000 monomer units in length, or about 100 to about 10,000 monomer units in length, or about 500 to about 10,000 monomer units in length, or about 1,000 to about 10,000 monomer units in length, or about 2,000 to about 10,000 monomer units in length, or about 3,000 to about 10,000 monomer units in length, or about 5,000 to about 10,000 monomer units in length, or about 10 to about 8,000 monomer units in length, or about 100 to about 8,000 monomer units in length, or about 1,000 to about 8,000 monomer units in length, or about 100 to about 7,000 monomer units in length, for example. The number of monomer units depends on the number of atoms in the monomer unit chain, and the composition of the monomer unit, for example.

In some examples, the organic polyamine has a molecular weight of about 90 to about 900,000 or more, or about 180 to about 900,000, or about 1,000 to about 900,000, or about 10,000 to about 900,000, or about 100,000 to about 900,000, or about 100 to about 750,000, or about 500 to about 750,000, or about 1,000 to about 750,000, or about 10,000 to about 750,000, or about 100,000 to about 750,000, or about 100 to about 500,000, or about 200 to about 500,000, or about 1,000 to about 500,000, or about 10,000 to about 500,000, or about 100,000 to about 500,000, or about 1000 to about 10,000, or about 1000 to about 5,000, for example.

In some examples, the organic polyamine has a number of amine groups, such as about 3 to about 100, or about 3 to about 80, or about 3 to about 60, or about 3 to about 40, or about 3 to about 30, or about 3 to about 20, or about 3 to about 10, or about 3 to about 5, or about 4 to about 100, or about 4 to about 80, or about 4 to about 60, or about 4 to about 40, or about 4 to about 30, or about 4 to about 20, or about 4 to about 10, or about 4 to about 5, about 5 to about 100, or about 5 to about 80, or about 5 to about 60, or about 5 to about 40, or about 5 to about 30, or about 5 to about 20, or about 5 to about 10 amine groups. The term "amine group" or "amine groups" refers to saturated primary, secondary and tertiary amine groups. The amine group does not comprise an unsaturation (double or triple bond) and, thus, the term does not include imine groups, nitrile groups, aziridine groups, azo groups, hydrazone groups, amidine groups, for example.

In some examples, the solubility of the organic polyamine in the hydrocarbon vehicle is at least about 95%, or at least about 99%, or about 90 to about 100%, or about 95 to about 100% soluble in the dielectric carrier fluid.

In examples of the organic polyamine that include a fatty acid backbone and at least one oligomeric amine-containing group, the fatty acid backbone may be derived from a fatty acid monomer, or a derivative thereof (e.g., ester, amide or carbonate) having about 10 to about 30 carbon atoms, or about 10 to about 25 carbon atoms, or about 10 to about 20 carbon atoms, or about 10 to about 15 carbon atoms, or about 12 to about 30 carbon atoms, or about 12 to about 25 carbon atoms, or about 12 to about 20 carbon atoms, or about 12 to about 15 carbon atoms, for example. The fatty acid monomer may be saturated or unsaturated (comprising at least one double or triple bond). The number of unsaturations (double or triple bonds) in the fatty acid monomer of the fatty acid backbone may range from 0 to about 10, or 0 to about 5, or 0 to about 4, or 0 to about 3, or 0 to about 2, or 0 to 1, or 1 to about 10, or 1 to about 5, or 1 to about 4, or 1 to about 3, or 1 to 2, or about 2 to about 10, or about 2 to about 5, or about 2 to about 4, or about 2 to about 3, for example.

In some examples, an oligomeric amine-containing group comprises 1 to about 100 monomeric groups, or 1 to about 80, or 1 to about 60, or 1 to about 40, or 1 to about 20, or 1 to about 10, monomeric groups, each of which comprise 2 to about 100, or 2 to about 80, or 2 to about 60, or 2 to about 40, or 2 to about 20, or 2 to about 10 carbon atoms may further comprise one or more heteroatoms such as oxygen, nitrogen, sulfur and phosphorus and combinations thereof, for example.

In some examples, the oligomeric amine-containing group has 1 to about 10 amine groups, or 1 to about 5, or 1 to about 4, or 1 to about 3, or 1 to 2 amine groups or 1 amine group. The oligomeric amine-containing group or groups may be pendant from one or more positions along the polymeric fatty acid backbone including terminal positions. The positions of the oligomeric-amine containing group(s) on the fatty acid backbone may be random or controlled and the arrangement of positions can be a specific steric, spatial, or optical (chiral) arrangement. In some examples, the number of oligomeric amine-containing groups in the organic polyamine is 1 to about 10, or 1 to about 5, or 1 to about 4, or 1 to about 3, or 1 to 2 or 1.

Examples of oligomeric amine-containing groups include, but are not limited to, those having a polymer backbone that comprises monomeric units of about 2 to about 10 carbon atoms, or about 2 to about 8 carbon atoms, or about 2 to about 6 carbon atoms or about 2 to about 5 carbon atoms, wherein the monomeric units further comprise 1 to about 5 nitrogen atoms, or 1 to about 4 nitrogen atoms, or 1 to about 3 nitrogen atoms, or 1 to about 2 nitrogen atoms, for example. Specific examples of oligomeric amine-containing groups include, but are not limited to, polyallylamine, polydiallylamine, polydimethylallylamine, poly(L-lysine), polyvinylamine, polypropylamine, poly(diallyldimethylamine), poly(3-acrylamidopropyl)tri-methylamine, poly[2-acryloyoloxyethyl]tri-methylamine, poly(3-methacrylamido-propyl)trimethylamine, and poly[2-methacryloyloxyethyl]trimethylamine, including combinations thereof and derivatives thereof.

In some examples, the organic polyamine includes, but is not limited to, a polyethylene amine, polyethylene N-substituted amine, a polyethylene comprising one or more pendant groups selected from the groups consisting of primary amine groups, secondary amine groups, tertiary amine groups, succinimide groups, aniline groups, and pyrrole groups, a polyethylene amine with one or more pendant oligomeric amine-containing groups, or polyethylene N-substituted amine with one or more oligomeric amine-containing groups. In some examples where the organic polyamine is a cationic polymer, the number of positive charges on the cationic polymer may range from 1 to about 10, or 1 to about 5, or about 2 to about 10, or about 2 to about 5, or about 3 to about 10, or about 3 to about 5, or about 4 to about 10, or about 4 to about 8, or about 4 to about 6, for example.

The term 'organic polyacid' as used herein also includes within its scope polyacids having a molecular weight of at least about 80 atomic mass units (amu), or at least about 100 amu, or at least about 900 amu, or at least about 1,000 amu, or at least about 2,000 amu, or at least about 3,000 amu, or at least about 4,000 amu, or at least about 5,000 amu, or at least about 10,000 amu, or at least about 50,000 amu, or at least about 100,000 amu, for example. In some examples, the organic polyacid has a molecular weight (amu) of about 90 to about 900,000 or more, or about 180 to about 900,000, or about 1,000 to about 900,000, or about 10,000 to about 900,000, or about 100,000 to about 900,000, or about 100 to about 750,000, or about 500 to about 750,000, or about 1,000 to about 750,000, or about 10,000 to about 750,000, or about 100,000 to about 750,000, or about 100 to about 500,000, or about 200 to about 500,000, or about 1,000 to about 500,000, or about 10,000 to about 500,000, or about 100,000 to about 500,000, for example.

In some examples, the organic polyacid is generally about 1 to about 10,000 monomer units or more in length, or about 10 to about 10,000 monomer units in length, or about 100 to about 10,000 monomer units in length, or about 500 to about 10,000 monomer units in length, or about 1,000 to about 10,000 monomer units in length, or about 2,000 to about 10,000 monomer units in length, or about 3,000 to about 10,000 monomer units in length, or about 5,000 to about 10,000 monomer units in length, or about 10 to about 8,000 monomer units in length, or about 100 to about 8,000 monomer units in length, or about 1,000 to about 8,000 monomer units in length, or about 100 to about 7,000 monomer units in length, for example. The number of monomer units depends on the number of atoms in the monomer unit chain, and the composition of the monomer unit, for example.

In some examples, the organic polyacid has, for example, 1 to about 10, or 1 to about 5, or 1 to about 4, or 1 to about 3, or 1 to 2 carboxyl groups or 1 carboxyl group and 1 to about 10, or 1 to about 5, or 1 to about 4, or 1 to about 3, or 1 to 2 hydroxyl groups or 1 hydroxy group. The hydroxyl groups and the carboxyl groups referred to above may not be derivatized, for example, non-esterified, and therefore, by definition may be 'free'. The hydroxyl groups of a hydroxy fatty acid monomer that form esters with carboxyl groups of the hydroxy fatty acid monomer in a poly condensation polymerization are not included within the numbers set forth above for free hydroxy groups and free carboxyl groups.

The solubility of the organic polyacid in the dielectric carrier fluid is at least about 85%, or at least about 90%, or at least about 95%, or at least about 99%, or 100%, for example. In some examples, the organic polyacid is about 90 to about 100%, or about 95 to about 100% soluble in the hydrocarbon vehicle.

In examples where the organic polyacid is a polymeric hydroxy fatty acid, the fatty acid may have about 10 to about 30 carbon atoms, or about 10 to about 25 carbon atoms, or about 10 to about 20 carbon atoms, or about 10 to about 15 carbon atoms, or about 12 to about 30 carbon atoms, or about 12 to about 25 carbon atoms, or about 12 to about 20 carbon atoms, or about 12 to about 15 carbon atoms, for example. In some examples, the polymeric hydroxy fatty acid has a number of repeating fatty acid monomers that may range from about 2 to about 10, or about 2 to about 8, or about 2 to about 6, or about 3 to about 6, or about 3 to about 5, or about 3 to about 4, repeating fatty acid monomers. The number of unsaturations (double or triple bonds) in the fatty acid of the fatty acid backbone may range from 0 to about 10, or 0 to about 5, or 0 to about 4, or 0 to about 3, or 0 to about 2, or 0 to 1, or 1 to about 10, or 1 to about 5, or 1 to about 4, or 1 to about 3, or 1 to 2, or about 2 to about 10, or about 2 to about 5, or about 2 to about 4, or about 2 to about 3, for example.

In some embodiments, the hydroxy fatty acid monomer that forms the polymeric hydroxy fatty acid may have about 1 to about 10 hydroxyl group(s), or about 1 to about 8, or about 1 to about 6, or 1 to about 5, or 1 to about 4, or 1 to about 3, or 1 to 2, or one hydroxyl group(s). In some embodiments, the polymeric hydroxy fatty acid is a condensation polymer where a carboxyl group of one hydroxy fatty acid monomer reacts to form an ester with a hydroxyl group of another hydroxy fatty acid monomer. The hydroxyl group may be attached to any carbon atom of the fatty acid or to any substituent group attached to a carbon atom of the fatty acid chain (i.e., the linear chain of carbon atoms that determine the length of the fatty acid). In some embodiments, the hydroxyl group (both free and derivatized such as by ester formation during polymerization) is on a non-terminal carbon atom of the fatty acid chain. In some examples, the hydroxyl group is on a carbon atom of the fatty acid chain that may be about 35% to about 70%, or about 35% to about 65%, or about 40% to about 70%, or about 40% to about 65%, carbon atoms from the carbon atom of the carboxyl group. For example, for poly(hydroxystearic acid) where the hydroxyl group is at the 12-position (on carbon atom 12 where the carboxyl carbon is carbon atom 1), the hydroxyl group would be 65% (11/17) from the carboxyl group.

In some examples, the polymeric hydroxy fatty acid is selected from the group consisting of poly(hydroxylauric acid), poly(hydroxymyristic acid), poly(hydroxypalmitic acid), poly(hydroxystearic acid) and poly(hydroxyarachidic acid). In some embodiments, the polymeric hydroxy fatty acid is selected from the group consisting of poly(hydroxylauric acid) (where the hydroxy of the fatty acid monomer is at carbon 5, 6 or 7), poly(hydroxymyristic acid) (where the hydroxy of the fatty acid monomer is at carbon 6, 7, 8 or 9), poly(hydroxypalmitic acid) (where the hydroxy of the fatty acid monomer is at carbon 7, 8, 9 or 10), poly(hydroxymargaric acid) (where the hydroxy of the fatty acid monomer is at carbon 7, 8, 9 or 10), poly(hydroxystearic acid) (where the hydroxy of the fatty acid monomer is at carbon 8, 9, 10, 11 or 12) and poly(hydroxyarachidic acid) (where the hydroxy of the fatty acid monomer is at carbon 8, 9, 10, 11, 12 or 13).

EXAMPLES

Unless otherwise indicated, materials in the experiments below may be purchased from Clariant, Lubrizol and ExxonMobile. Parts and percentages are by weight unless indicated otherwise.

Monoazo Pigment-based Ink Composition: About 6% of HOSTAPERM® Yellow H5G10 pigment (Pigment Yellow 213) from Clariant was mixed with about 2.7% of SOLSPERSE® 19000 dispersant (an organic polyamine) from Lubrizol in ISOPAR® L isoparaffinic solvent from ExxonMobil as the dielectric carrier fluid in a paint shaker for about 15 minutes followed by room temperature agitation in an orbital shaker (model 420 Forma, Thermo Scientific, Waltham, Mass.) for about 16 hours at about 150 rpm. The mixture was deagglomerated using a Kotobuki UAM-015 vertical rotary bead mill (Kotobuki Industries Co., LTD, Japan) for about 20 minutes with rotor tip speed of about 7 m/s, recirculation flow rate of about 170 ml/min, and coolant temperature of about 10° C. using about 0.1 mm spherical oxide media (e.g., Zirconium oxide ($ZrO_2$)) to make an ink dispersion. An operable ink composition was then created by diluting the milled ink with ISOPAR® L and additional SOLSPERSE® SP19000 dispersant to get a pigment concentration of about 4% and dispersant concentration of about 1.8%. The operable ink composition had a room temperature viscosity of about 3 cP as measured on a HAAKE CV100 rheometer (Thermo Fisher Scientific, Waltham, Mass.), an ink conductivity of 118 pS/cm and a supernatant conductivity of about 29.4 pS/cm (measured on centrifuged supernatant) measured with a Scientifica model 627 conductivity meter (Scientific Co., Princeton, N.J.). The operable ink composition had an average particle size of about 192 nm, as measured by dynamic light scattering on a diluted sample on a Malvern Zetasizer® particle size analyzer (Malvern Instruments Ltd, Worcestershire, UK). The solids remained in suspension for at least 1 week at room temperature as determined by visual assessment of sediment on the base of the storage container.

Two Dispersant, Monoazo Pigment-based Ink Composition: About 6% of HOSTAPERM® Yellow H5G10 (P.Y. 213) pigment from Clariant was mixed with about 1.8% of SOLSPERSE® SP19000 dispersant (an organic polyamine) and about 4.2% of SOLSPERSE® SP21000 dispersant (an organic polyacid) in ISOPAR® L isoparaffinic solvent as the dielectric carrier fluid in the manner described above in the previous example. The mixture was deagglomerated using the Kotobuki UAM-015 vertical rotary bead mill for about 18 minutes with rotor tip speed of about 9 m/s, recirculation flow rate of about 170 ml/min and coolant temperature of about 10° C. using about 0.05 mm spherical oxide media (e.g., $ZrO_2$) to make an ink dispersion. An operable ink composition was made by diluting the milled ink dispersion with ISOPAR® L to get a pigment concentration of about 4%, a SOLSPERSE® SP19000 dispersant concentration of about 1.2% and a SOLSPERSE® SP21000 dispersant concentration of about 2.8%. The operable ink composition had a room temperature viscosity of about 3 cP, an electrical conductivity of about 45 pS/cm, and an average particle size of about 236 nm, each measured in the manner described above for Example 1. The dispersion was stable for at least several days at room temperature as determined by visual assessment of sediment on the base of the storage container.

Azo Pigment-based Ink Composition: About 27% of Toner Magenta 6B VP2213 pigment (Pigment Red 57:1) from Clariant was mixed by stirring with about 10.8% SOLSPERSE® SP9000 dispersant (an organic polyamine/polyacid) in ISOPAR® L isoparaffinic solvent as the dielectric carrier fluid. The mixture was deagglomerated using a Fritsch Pulverisette 7 planetary mill (Fritsch GmbH, Idar-Oberstein, Germany) with about 800 rpm planetary motion for about 80 minutes using about 0.5 mm spherical oxide media (e.g., $ZrO_2$) in a 45 milliliter $ZrO_2$ bowl to make an ink dispersion. Temperature was maintained below 50° C. during milling. An operable ink composition was made by diluting the milled ink with ISOPAR® L to get a pigment concentration of about 4% and a dispersant concentration of about 1.6%. The operable ink composition had an electrical conductivity of about 182 pS/cm and an average particle size of about 230 nm, both measured in the manner described above for the first described example provided above. The dispersion was stable for at least several days at room temperature as determined by visual assessment of sediment on the base of the storage container.

Disazo Pigment-based Ink Composition: About 15% of Toner Yellow HG pigment (P.Y. 180) from Clariant was mixed with about 3% of SOLSPERSE® SP11200 dispersant in ISOPAR® L isoparaffinic solvent as the dielectric carrier fluid in the manner described above in the first described example provided above. The solution was then further mixed for about 5 minutes in a model IKA T-25 Ultra-Turrax homogenizer (IKA, Staufen, Germany) The mixture was deagglomerated using the Kotobuki UAM-015 vertical rotary bead mill for about 30 minutes with rotor tip speed of about 9 m/s, recirculation flow rate of about 170 ml/min and coolant temperature of about 10° C. using about 0.05 mm spherical oxide media (e.g., $ZrO_2$) to make an ink dispersion. An operable ink composition was made by diluting the milled ink dispersion with ISOPAR® L to get a pigment concentration of about 4% and a SOLSPERSE® 11200 concentration of about 0.8%. The operable ink composition had a room temperature viscosity of about 3 cP, an electrical conductivity of about 63 pS/cm and a supernatant conductivity of about 23 pS/cm. The operable ink composition also had an average particle size of about 184 nm, as measured in the manner described in the first example provided above. The dispersion was stable for at least several weeks as determined by visual assessment of sediment on the base of the storage container.

Thus, there have been described examples of embodiments of an ink composition having controlled conductivity, methods of making and printing the ink composition and a digital printing system that employs the ink composition. It should be understood that the above-described examples are merely illustrative of some of the many specific examples that represent the principles of the present embodiments. Clearly, those skilled in the art can readily devise numerous other arrangements without departing from the scope of the present embodiments as defined by the following claims.

What is claimed is:
1. An ink composition having controlled conductivity comprising:
particles of a pigment dispersed in an oil-based dielectric carrier fluid with a dispersant that is soluble in the dielectric carrier fluid, a concentration of the dispersant being a fraction of a concentration of the pigment particles sufficient to render the ink composition with an electri- cal conductivity of less than 100 pico Siemens per centimeter (pS/cm) in an operable form compatible with inkjet printing.

2. The ink composition of claim 1, wherein the pigment particle concentration ranges from about 1 weight percent to about 10 weight percent, the dispersant concentration fraction ranging from about 0.05 to about 1.0 by weight.

3. The ink composition of claim 1, wherein the concentration of the dispersant is less than about 1.5 times a threshold concentration above which an electrical conductivity of one or both of the ink composition and a supernatant of the ink composition begins to rise in proportion to an amount of the dispersant added above the threshold concentration.

4. The ink composition of claim 1, wherein an average particle size of the pigment particles is less than or equal to about 300 nanometers.

5. The ink composition of claim 1, wherein a viscosity of the ink composition ranges from about 2 centi Poise (cP) to about 15 cP.

6. The ink composition of claim 1, wherein the dielectric carrier fluid comprises one or more of an isoparaffinic hydrocarbon solvent, a paraffinic hydrocarbon solvent, and a mineral oil.

7. The ink composition of claim 1, wherein the pigment is an organic pigment selected from a group consisting of a monoazo pigment and a disazo pigment.

8. The ink composition of claim 1, wherein the dispersant comprises one or both of an organic polyamine and an organic polyacid.

9. The ink composition of claim 1, wherein the pigment is an azo-based pigment, the dielectric carrier fluid being an isoparaffinic solvent, and wherein the dispersant is selected from a group consisting of an organic polyamine and an organic polyacid.

10. The ink composition of claim 1, wherein a ratio of dispersant to pigment particles in the dielectric carrier fluid is to facilitate adhesion of the pigment particles to a surface and cohesion of the pigment particles to each other on the surface both facilitated by a directed exposure from an energy source.

11. A digital printing system comprising:
an ink that comprises an oil-based dielectric carrier fluid, a dispersant soluble in the dielectric carrier fluid, and particles of a pigment dispersed in the dielectric carrier fluid with the dispersant, a concentration of the dispersant being a fraction of a concentration of the pigment particles sufficient to render an electrical conductivity of ink less than or equal to about 300 pico Siemens per centimeter (pS/cm);
a transfer medium;
an inkjet print head to nonelectrostatically jet the ink to the transfer medium;
means for developing the ink on the transfer medium to fix the pigment particles to the transfer medium;
means for removing a portion of a supernatant of the ink from the transfer medium; and
means for transferring an image to a media substrate, the image comprising the fixed pigment particles.

12. The digital printing system of claim 11, wherein the means for developing the ink comprises an energy source directed at the ink on the transfer medium, the energy source imparting an electrical force on the pigment particles of the ink, wherein directed exposure to the electrical force facilitates both cohesion of the pigment particles to each other and adhesion of the pigment particles to the transfer medium.

13. The digital printing system of claim 11, wherein one or both of the ink and the supernatant of the ink has an electrical conductivity that is less than 100 pS/cm.

14. The digital printing system of claim 11, wherein the concentration of pigment particles ranges from about 1% to about 10% by weight, the dispersant concentration fraction ranging from about 0.05 to about 1 by weight.

15. The digital printing system of claim 11, wherein the pigment is selected from a group consisting of a monoazo pigment and a disazo pigment, and wherein the dispersant is selected from a group consisting of an organic polyamine and an organic polyacid, the organic polyamine having a polymeric fatty acid backbone and at least one oligomeric amine-containing group, the organic polyacid comprising a polymeric hydroxy fatty acid, and wherein the dielectric carrier fluid is selected from a group consisting of an isoparaffinic hydrocarbon solvent, a paraffinic hydrocarbon solvent, and a mineral oil.

16. A method of printing an ink in operable form with controlled conductivity, the method comprising:
nonelectrostatically jetting the ink from an inkjet print head onto a transfer medium, the ink comprising pigment particles dispersed by an oil-soluble dispersant in an oil-based dielectric carrier fluid, a concentration of the dispersant being a fraction of a concentration of the pigment particles sufficient to render an electrical conductivity of the ink less than or equal to about 300 pS/cm;
developing the ink on a surface of the transfer medium such that pigment particles from the ink are fixed to the transfer medium surface in an image;
removing a portion of a supernatant of the ink from the fixed pigment particles; and
transferring the image of fixed pigment particles to a substrate.

17. The method of printing an ink of claim 16, wherein developing the ink comprises directly exposing the jetted ink on the transfer medium to an electric charge, a ratio of the dispersant to the pigment particles in the dielectric carrier fluid facilitating cohesion of the pigment particles to each other and adhesion of the pigment particles to a surface of the transfer medium during developing the ink.

18. The method of printing an ink of claim 16, wherein one or both of the ink and the supernatant of the ink has an electrical conductivity that is less than 100 pS/cm.

19. The method of printing an ink of claim 16, further comprising making the ink in the operable form before nonelectrostatically jetting, wherein making the ink comprises:
mixing together the pigment particles, the dispersant and the dielectric carrier fluid;
processing the mixture to deagglomerate the pigment particles and to form an ink dispersion; and
rendering the ink dispersion into the ink in operable form, wherein the concentration of pigment particles in the operable ink ranges from about 1% to about 10% by weight, the dispersant concentration fraction ranging from about 0.05 to about 1 by weight, an average particle size of the pigment particles being less than about 300 nanometers, and wherein a viscosity of the ink ranges from about 2 centi Poise (cP) to about 15 cP.

20. An ink composition having controlled conductivity comprising:
an isoparaffinic solvent;
a pigment in a concentration ranging from about 1% to about 10% by weight; and
an organic dispersant comprising one or both of a polyamine and a polyacid that disperses the pigment in the isoparaffinic solvent, an amount of the organic dispersant being a weight fraction ranging from about 0.05 to about 1 of the pigment concentration, wherein an electrical conductivity of one or both of the ink composition and a supernatant portion of the ink composition is less than 100 pico Siemens per centimeter (pS/cm) in an operable form compatible with digital offset inkjet printing, and wherein one or both of an average pigment particle size is less than about 300 nanometers and a viscosity of the ink composition ranges from about 2 centi Poise (cP) to about 15 cP.

* * * * *